US011980901B2

(12) United States Patent
Marshall et al.

(10) Patent No.: US 11,980,901 B2
(45) Date of Patent: May 14, 2024

(54) REFILLABLE DISPENSER HAVING RESERVOIRS AND REFILL CONTAINERS CONFIGURED FOR FLUID AND AIR TRANSFER THEREBETWEEN

(71) Applicant: GOJO Industries, Inc., Akron, OH (US)

(72) Inventors: Aaron D. Marshall, Uniontown, OH (US); Nick E. Ciavarella, Seven Hills, OH (US); Donald Russell Harris, Mogadore, OH (US)

(73) Assignee: GOJO Industries, Inc., Akron, OH (US)

(*) Notice: Subject to any disclaimer, the term of this patent is extended or adjusted under 35 U.S.C. 154(b) by 0 days.

(21) Appl. No.: 17/728,034

(22) Filed: Apr. 25, 2022

(65) Prior Publication Data

US 2023/0158527 A1 May 25, 2023

Related U.S. Application Data

(63) Continuation of application No. 16/623,150, filed as application No. PCT/US2018/041053 on Jul. 6, 2018, now Pat. No. 11,331,685.

(Continued)

(51) Int. Cl.
*B05B 11/00* (2023.01)
*A47K 5/12* (2006.01)

(Continued)

(52) U.S. Cl.
CPC ........ *B05B 11/0054* (2013.01); *A47K 5/1202* (2013.01); *A47K 5/1207* (2013.01);

(Continued)

(58) Field of Classification Search
CPC ............ B05B 11/0056; B05B 11/0044; A47K 5/1202
See application file for complete search history.

(56) References Cited

U.S. PATENT DOCUMENTS 4,018,363 A * 4/1977 Cassia .................. A47K 5/1208 222/207
4,036,406 A * 7/1977 Jespersen .............. G01F 11/025 137/853

(Continued)

FOREIGN PATENT DOCUMENTS

CH 414977 A * 6/1966
EP 711673 A1 5/1996

(Continued)

OTHER PUBLICATIONS

Invitation to Pay Additional Fees from PCT/US2018/041053 dated Sep. 26, 2018.

(Continued)

*Primary Examiner* — Bob Zadeh
(74) *Attorney, Agent, or Firm* — Calfee, Halter & Griswold LLP

(57) ABSTRACT

A fluid dispenser includes a housing, a pump, an outlet nozzle, a reservoir, a liquid passage, an air passage, and a refill container. The pump and reservoir are attached to the housing, and both the outlet nozzle and the reservoir are in fluid communication with the pump. The reservoir has at least one engagement member, and the liquid passage and the air passage are located in the engagement member. The refill container has at least one sealing member, and the refill container is configured to be releasably attached to the reservoir such that the refill container is in fluid communication with the reservoir. When the refill container is attached to the reservoir, the engagement member engages (Continued)

the sealing member to cause the liquid passage and the air passage to be in fluid communication with the refill container.

20 Claims, 17 Drawing Sheets

Related U.S. Application Data

(60) Provisional application No. 62/529,812, filed on Jul. 7, 2017.

(51) Int. Cl.
*A47K 5/14* (2006.01)
*B05B 11/10* (2023.01)
*B67D 3/00* (2006.01)

(52) U.S. Cl.
CPC .......... *A47K 5/1208* (2013.01); *A47K 5/1211* (2013.01); *A47K 5/14* (2013.01); *B05B 11/0044* (2018.08); *B05B 11/0056* (2013.01); *B05B 11/1087* (2023.01); *B67D 3/0032* (2013.01)

(56) References Cited

U.S. PATENT DOCUMENTS 4,316,555 A 2/1982 Smith
4,360,130 A 11/1982 Nishimura et al.
4,391,309 A * 7/1983 Steiner ................. A47K 5/1208 141/330
4,493,440 A * 1/1985 von Buelow ........ A47K 5/1204 222/375
4,576,313 A * 3/1986 Smith .................. A47K 5/1208 141/330
5,082,150 A 1/1992 Steiner et al.
5,421,489 A 6/1995 Holzner, Sr. et al.
5,897,031 A 4/1999 Wirt et al.
6,675,845 B2 1/2004 Volpenheim et al.
2003/0040700 A1* 2/2003 Hickle .................. A61M 5/162 604/890.1
2003/0071058 A1* 4/2003 Studer ...................... A47K 5/12 222/88
2006/0175354 A1* 8/2006 Ophardt ............... A47K 5/1202 222/188
2013/0037575 A1 2/2013 Van Der Molen
2014/0077000 A1* 3/2014 Cooper ................. B05B 7/2489 239/302
2014/0203047 A1* 7/2014 McNulty ................ B65D 83/38 222/190
2014/0263464 A1 9/2014 Corney
2015/0335208 A1 11/2015 Ciavarella et al.
2016/0029855 A1* 2/2016 Harris ................... B05B 7/0037 222/135
2020/0197966 A1 6/2020 Marshall et al.

FOREIGN PATENT DOCUMENTS

EP 1118301 A1 7/2001
EP 2873357 A1 * 5/2015 ........... A47K 5/1202

OTHER PUBLICATIONS

International Search Report and Written Opinion from PCT/US2018/041053 dated Nov. 22, 2018.

* cited by examiner

REFILLABLE DISPENSER HAVING RESERVOIRS AND REFILL CONTAINERS CONFIGURED FOR FLUID AND AIR TRANSFER THEREBETWEEN

RELATED APPLICATIONS

This application is a continuation of U.S. application Ser. No. 16/623,150, filed Dec. 16, 2019, which is the U.S. national stage entry of PCT/US2018/041053, filed Jul. 6, 2018, which claims priority to and the benefits of U.S. Provisional Application No. 62/529,812, filed on Jul. 7, 2017, all of which are incorporated in their entirety herein by reference.

TECHNICAL FIELD

The present invention relates generally to dispensing systems and more particularly to dispensers having a reservoir and a non-collapsing refill container that is selectively installable in a fluid dispenser such that fluid and air are transferred between the reservoir and the refill container.

BACKGROUND

Conventional cartridge based soap and sanitizers dispensers use disposable refill cartridges. The disposable refill cartridges typically include a container and a pump. These disposable refill cartridges are single-use type and thus incapable of being refilled.

SUMMARY

An exemplary dispensing system includes a housing, a pump, an outlet nozzle, a reservoir, a liquid passage, an air passage, and a refill container. The pump and reservoir are attached to the housing, and both the outlet nozzle and the reservoir are in fluid communication with the pump. The reservoir has at least one engagement member, and the liquid passage and the air passage are located in the engagement member. The refill container has at least one sealing member, and the refill container is configured to be releasably attached to the reservoir such that the refill container is in fluid communication with the reservoir. When the refill container is attached to the reservoir, the engagement member engages the sealing member to cause the liquid passage and the air passage to be in fluid communication with the refill container.

Another exemplary dispensing system includes a housing, a reservoir, an air passage, a liquid passage, at least one engagement member, a pump, an outlet nozzle, and a refill container. The reservoir is secured to the housing and includes a cavity located in its upper portion, in which the cavity is configured so that air in the reservoir migrates to the cavity. The air passage extends upward from the cavity, and the liquid passage extends upward from the reservoir. A bottom of the liquid passage is located below a bottom of the air passage. The engagement member is configured to mate with a refill container. The pump has a pump chamber that is in fluid communication with the reservoir and the outlet nozzle. The refill container is configured to releasably attach to the reservoir such that the refill container is in fluid communication with the reservoir through the at least one engagement member. The refill container also has at least one sealing member.

Another exemplary dispensing system includes a housing, a reservoir, a pump having a pump chamber, an outlet nozzle, a liquid passage, an air passage, a refill container, and a vent valve. The reservoir is attached to the housing and includes at least one engagement member. Both the reservoir and the outlet nozzle are in fluid communication with the pump chamber. The liquid passage as a liquid inlet and a liquid outlet, and the air passage has an air inlet and an air outlet. The air inlet is disposed above the liquid outlet when the dispensing system is in use. The refill container has a sealing member and is configured to be attached to the reservoir such that the refill container is in fluid communication with the reservoir. The vent valve allows air into at least one of the reservoir and the refill container. When the refill container is attached to the reservoir, the engagement member engages the sealing member to cause the liquid passage and the air passage to be in fluid communication with the refill container. Operation of the pump causes liquid to move from the refill container to the reservoir through the liquid passage, and causes air to move from the reservoir to the refill container through the air passage if there is air in the reservoir.

Another exemplary dispenser includes a semi-permanent reservoir that is releasably secured to the dispenser. A pump is connected to the semi-permanent reservoir. A vent valve located on a top surface of the semi-permanent reservoir and a reservoir connector is located on a top surface of the semi-permanent reservoir. The exemplary dispenser includes a refill unit. The refill unit has a refill connector. The refill connector connects to the reservoir connector to transfer fluid between the refill unit and the semi-permanent reservoir.

Another exemplary dispenser includes a semi-permanent reservoir. A pump is in fluid communication with the semi-permanent reservoir. A vent valve located on a top surface of the semi-permanent reservoir and a reservoir connector is located on a top surface of the semi-permanent reservoir. The reservoir connector is configured to mate with a refill connector when a refill unit is placed in the dispenser.

Exemplary embodiments of inserts for dispensers are disclosed herein. an exemplary insert includes a semi-permanent reservoir and a pump in fluid communication with the semi-permanent reservoir. A vent valve is located on a top surface of the semi-permanent reservoir. A reservoir connector is located on a top surface of the semi-permanent reservoir. The reservoir connector is configured to mate with a refill connector when a refill unit is placed in the dispenser.

Another exemplary insert for a dispenser includes a refill unit. The refill unit has a refill connector. The refill connector connects to a reservoir connector to transfer fluid between the refill unit and the semi-permanent reservoir.

DETAILED DESCRIPTION

Figure 1:
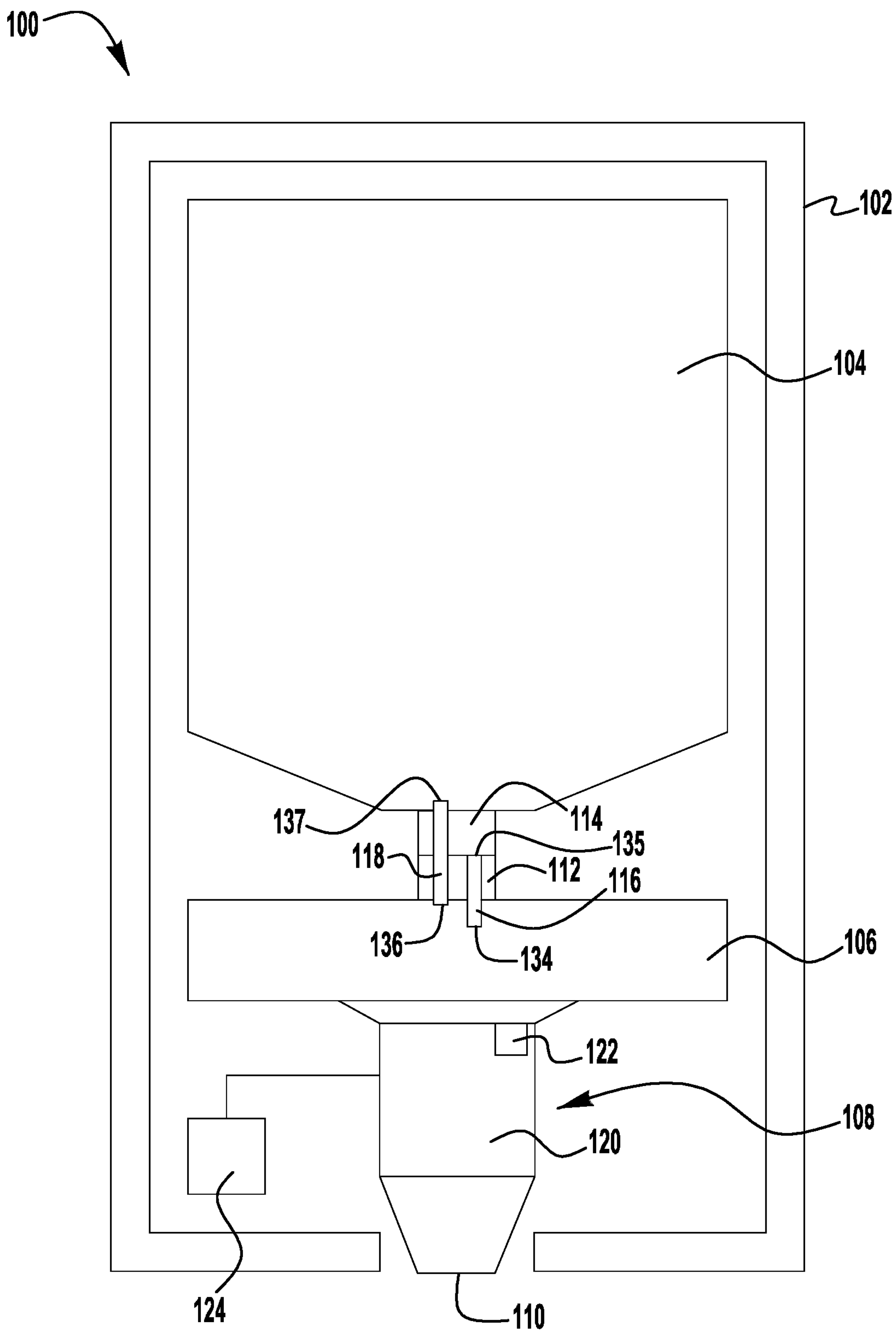
FIG. 1 is a schematic view of an exemplary embodiment of a fluid dispenser having a reservoir and a refill container.

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Fluid dispensers often include inverted containers that hold a liquid (e.g., soap, sanitizer, lotion, etc.) and have pumps attached thereto. The fluid is pumped out through a nozzle and into the hands of a user. Fluid dispensers may be disposed in various locations, such as, for example, hospitals, patient rooms, restrooms, schools, restaurants, or any other suitable location. As people use the fluid dispensers, the inverted containers run out of fluid and need to be replaced. As the inverted containers are running low on fluid, the maintenance staff at these locations needs to decide when to replace the near empty containers with new containers so that the dispensers are always in condition to be used by a user. If refill containers are not replaced until completely empty, there is a risk that a user will attempt to use the fluid dispenser without being able to obtain any fluid. On the other hand, if the maintenance staff replaces a refill container when the container is not completely empty, the remaining fluid in the container is wasted.

The exemplary fluid dispensers disclosed herein are configured to transfer fluid from a non-collapsing refill container to a reservoir of the fluid dispenser such that the non-collapsing refill container can be removed and replaced when empty while still maintaining a quantity of fluid in the reservoir. This allows a refill container to be removed while there is still fluid in the fluid dispensing system, which prevents the risk that a user will attempt to use the fluid dispenser without being able to obtain any fluid, such as, for example, soap, sanitizer or lotion. This also allows refill containers to be removed when they are completely empty, which prevents the waste of fluid that remains in the refill container.

In some exemplary embodiments, the reservoir and pump attached thereto are removeable and replaceable. The reservoir and pump may be removed and replaced according to selected time intervals, selected throughput of fluid, and/or when the reservoir or pump fails, such as, for example, if the pump clogs or wears out.

The exemplary fluid dispensers are also configured to transfer air from the reservoir to the refill container during use. The transfer of air from the reservoir to the refill container allows a chamber of the dispenser's pump to prime more easily. In addition, the transfer of air from the reservoir to the refill container ensures that the pump will draw in liquid after each pump and not air. In addition, the movement of the air from the reservoir to the refill container prevents the refill container from collapsing as fluid moves from the refill container to the reservoir. Exemplary embodiments of the fluid dispenser can also be configured such that the reservoir does not become air locked, i.e. air is permitted to move from the reservoir to the refill container.

FIGS. 1-10 illustrate various embodiments of a fluid dispenser 100 for dispensing a fluid (soap, sanitizer, lotion, etc.) to a user. The fluid dispenser includes a housing 102 (see FIG. 1), an inverted refill container 104, a reservoir 106, a pump 108, and an outlet nozzle 110. In certain embodiments, the reservoir 106, the pump 108, and the outlet nozzle 110 are fixed to the housing 102. In other embodiments, any of the reservoir 106, the pump 108, and the outlet nozzle 110 can be removeable from the housing 102 and replaceable. In some embodiments, the reservoir 104 has a volume between about 25 milliliters and about 300 millimeters. In some embodiments, the reservoir 104 has a volume between about 50 milliliters and about 250 millimeters. In some embodiments, the reservoir 104 has a volume between about 60 milliliters and about 150 millimeters. In some embodiments, the reservoir 104 has a volume of less than about 300 milliliters, including about 250 milliliters, including about 2000 milliliters, including about 150 milliliters, including about 100 milliliters, including about 50 milliliters. The term "about" as used herein means +/−10%, The inverted refill container 104 is configured to be removably connected to the reservoir 106 such that the interiors of the containers are in fluid communication with each other when they are connected together. The inverted refill container 104 is non-collapsible container. The refill container 104 includes at least one sealing member 114 that is configured to seal the interior of the refill container 104 until the refill container 104 is connected to the reservoir 106. The sealing member 114 can be, for example, a poppet, a silicon seal, a slit valve, combinations thereof, or the like. The reservoir 106 includes at least one engagement member 112 that is configured to engage the at least one sealing member 114 of the refill container 104 to connect the refill container to the reservoir 106 and open the at least one sealing member 114 such that the interiors of the refill container 104 and the reservoir 106 are in fluid communication with each other. The engagement member 112 can be, for example, a post, a puncture needle. In addition, the engagement member 112 and/or the reservoir 106 has a liquid passage 116 and an air passage 118, and both the liquid passage 116 and air passage 118 are in fluid communication with the interior of the refill container 104 when the engagement member 112 engages the sealing member 114. In certain embodiments, the liquid passage 116 and the air passage 118 are disposed within the engagement member 112.

The reservoir 106 is in fluid communication with the pump 108 such that the pump can pump liquid from the reservoir 106 through the nozzle 110. The pump 108 can be, for example, a displacement pump, such as, a piston pump, a diaphragm pump, a rotary pump, or the like. In certain embodiments, the pump 108 may be a sequentially activated multi-diaphragm pump. Exemplary embodiments of sequentially activated multi-diaphragm pumps are shown and disclosed in: U.S. Non-Provisional application Ser. No. 15/429,389 filed on Feb. 10, 2017 and titled HIGH QUALITY NON-AEROSOL HAND SANITIZING FOAM; U.S. Non-Provisional application Ser. No. 15/369,007 filed on Dec. 5, 2016 and titled SEQUENTIALLY ACTIVATED MULTI-DIAPHRAGM FOAM PUMPS, REFILL UNITS AND DISPENSER SYSTEMS; U.S. Non-Provisional patent application Ser. No. 15/355,112 filed on Nov. 18, 2016 and titled SEQUENTIALLY ACTIVATED MULTI-DIAPHRAGM FOAM PUMPS, REFILL UNITS AND DISPENSER SYSTEMS; U.S. Non-Provisional application Ser. No. 15/350,190 filed on Nov. 14, 2016 and titled IMPROVED FOAMING CARTRIDGE; U.S. Non-Provisional application Ser. No. 15/356,795 filed on Nov. 21, 2016 and titled FOAM DISPENSING SYSTEMS, PUMPS AND REFILL UNITS HAVING HIGH AIR TO LIQUID RATIOS; and U.S. Non-Provisional application Ser. No. 15/480,711 filed on Apr. 6, 2017 and titled FOAM DISPENSING SYSTEMS, PUMPS AND REFILL UNITS HAVING HIGH AIR TO LIQUID RATIOS; each of which are incorporated herein in their entirety.

In certain embodiments, the pump 108 may be a foam pump, and the fluid dispenser may include a foam cartridge (not shown). In certain of these exemplary embodiments, the foam pump may create a liquid-air mixture that travels through the foam cartridge to create a rich foam. Exemplary embodiments of foam pumps are shown and described in, U.S. Pat. No. 7,303,099 titled Stepped Pump Foam Dispenser; U.S. Pat. No. 8,002,150 titled Split Engagement Flange for Soap Piston; U.S. Pat. No. 8,091,739 titled Engagement Flange for Fluid Dispenser Pump Piston; U.S. Pat. No. 8,113,388 titled Engagement Flange for Removable Dispenser Cartridge; U.S. Pat. No. 8,272,539, Angled Slot Foam Dispenser; U.S. Pat. No. 8,272,540 titled Split Engagement Flange for Soap Dispenser Pump Piston; U.S. Pat. No. 8,464,912 titled Split Engagement Flange for Soap Dispenser Pump Piston; U.S. Pat. No. 8,360,286 titled Draw Back Push Pump; U.S. Provisional Pat. Ser. No. 62/293,931 titled High Quality Non-Aerosol Hand Sanitizing Foam; U.S. Provisional Pat. Application Ser. No. 62/257,008 titled Sequentially Activated Multi-Diaphragm Foam Pumps, Refill Units and Dispenser Systems; U.S. Pat. No. 8,172,555 titled Diaphragm Foam Pump; U.S. 2008/0,277,421 titled Gear Pump and Foam Dispenser, all of which are incorporated herein by reference in their entirety. These exemplary foam pumps may be converted to liquid pumps by removing the air components.

The foam pumps typically include foaming media or foaming cartridges. Exemplary foaming media include, screens, porous material, sponge, and the like and may be in the form of foaming cartridges. Exemplary embodiments of foaming cartridges are shown and described in U.S. Publication No. 2014/0367419, titled Foam Cartridges, Pump, Refill Units and Foam Dispensers Utilizing The Same, which is incorporated herein by reference in its entirety.

In various embodiments, the dispenser 100 is a "touch free" dispenser and includes an actuator 124 that activates the pump 108 to pump liquid from the reservoir 106 and out of the outlet nozzle 110. In some embodiments, the incorporated dispensers need certain modifications to receive the reservoir 106/pump 108 and refill container 104. Exemplary touch-fee dispensers are shown and described in U.S. Pat. No. 7,837,066 titled Electronically Keyed Dispensing System And Related Methods Utilizing Near Field Response; U.S. Pat. No. 9,172,266 title Power Systems For Touch Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hands-Free Dispensing of a Measured Quantity of Material; U.S. Pat. No. 7,621,426 titled Electronically Keyed Dispensing Systems and Related Methods Utilizing Near Field Response; and U.S. Pat. Pub. No. 8,960,498 titled Touch-Free Dispenser with Single Cell Operation and Battery Banking; all which are incorporated herein by reference. In embodiments that include a touch-free feature, the dispenser 100 may include a power source (not shown), a sensor (not shown) for detecting the presence of a hand, a controller (not shown), and a motor (not shown), which are all known in the art. The power source is in electrical communication with and provides power to the sensor, controller, and motor. The power source may be an internal power source, such as, for example, one or more batteries or an external power source, such as, for example, solar cells, or a conventional 120 VAC power supply, or combinations thereof.

In various embodiments, the dispenser is a manual dispenser. In such embodiments, the actuator 124 may require manual activation, such as, for example, a user engages a push bar, a user engages a foot pedal, a pushbutton, or the like. In some embodiments that require manual activation, the actuator 124 is a push bar that is mechanically coupled to the pump 108 and, when a user engages the push bar, the pump 108 causes liquid from the reservoir 106 to exit the outlet nozzle 110 of the dispenser 100.

Referring to the illustrated embodiments, the pump 108 has a pump chamber 120 that is in fluid communication with the reservoir 106. In these embodiments, activation of the pump 108 causes fluid to flow from the pump chamber 120 and through the outlet nozzle 110. Subsequently, on the return stroke the pump 108 is primed, which causes liquid to flow from the reservoir 106 and into the pump chamber 120. When the refill container 104 is attached to the reservoir 106, the priming of the pump 108 also causes liquid to flow from the refill container 104 and into the reservoir 106 through the liquid passage 116.

As liquid flows through the liquid passage 116 and into the reservoir 106, air may be transferred from the reservoir 106 and into the refill container 104 through the air passage 118. This movement of air from the reservoir 106 and into the refill container 104 is facilitated by a negative pressure that is created in the refill container 104 due to the transfer of liquid from the refill container 104 and into the reservoir 106. Movement of air from the reservoir 106 and into the refill container 104 prevents collapsing of the refill container due to this negative pressure. In addition, this movement of air into the refill container 104 eliminates the vacuum pressure required to collapse the container and thus allows liquid to more easily flow from the reservoir 106 and into the pump chamber 120.

Air may enter the reservoirs disclosed herein by several means. First, prior to the first use, the entire reservoir will be filled with air. In some embodiments, when the refill container is empty, air that is in refill container is sucked into reservoir prior to refill container being removed from the dispenser. In some embodiments, air enters reservoir through the liquid passage or air passage when the refill container is removed and the dispenser is used, or due to vacuum pressure in reservoir that draws in air when the refill container is removed. In some embodiments, air will flow into the reservoir through use of a container venting pumps. Exemplary embodiments of container venting pumps are shown and disclosed in U.S. Pat. No. 9,936,840 titled Vented Refill Units and Dispensers Having Vented Refill Units, which issued on Apr. 10, 2018; U.S. Pat. No. 9,038,862 titled Pumps with Container Vents, which issued on May 26, 2015; U.S. Pat. No. 9,949,599 titled Vent Valves and Refill Units with Vent Valves For Use With Inverted Non-Collapsing Containers which issued on Apr. 24, 2018; U.S. Pat. No. 9,648,992 titled Pumps with Vents to Vent Inverted Containers and Refill Units Having Non-Collapsing Containers, which issued on May 16, 2017; and U.S. Pat. No. 9,648,990 titled Venting System for Dispenser Reservoir, which issued on May 16, 2017. All of which are incorporated herein by reference in their entirety. In addition to providing air to the reservoir, or leu of providing air to the reservoir, the venting techniques and components shown and described in the first four of these patents may be incorporated into the reservoir 106 (or other reservoirs disclosed herein) to allow air directly into the non-collapsing container. In such embodiments, there may be two methods of venting the non-collapsing container, one transferring air from the reservoir to the refill container and one transferring atmospheric air directly into the refill container. In some embodiments, the vent valve that allows air directly into the refill container may be selected to ensure that substantially all of the air in the reservoir is transferred to the refill container before allowing atmospheric air into the reservoir.

Referring back to FIG. 1, the liquid passage 116 has a liquid outlet 134 that is in fluid communication with the interior of the reservoir 106 and a liquid inlet 135 in fluid communication with the interior of the refill container 104. The air passage 118 has an air inlet 136 that is in fluid communication with the interior of the reservoir 106 and an air outlet 137 in fluid communication with the interior of the refill container 104. In some embodiments, the air outlet 137 is located above the liquid inlet 135, which prevents air exiting air outlet 137 from being sucked into the liquid inlet 135. In certain embodiments, the air inlet 136 is disposed above the liquid outlet 134.

This exemplary embodiment is advantageous because it prevents air lock of the liquid passage 116. That is, priming of the pump 108 will cause a pressure differential between reservoir 106 and the refill container 104. This pressure differential will cause air to move from the reservoir 106 and into the refill container 104. By placing the air inlet 136 of the air passage 118 above the liquid outlet 134 of the liquid passage 116, the air will move towards the air passage 118 in order to move into the refill container 104. If the air inlet 136 were not disposed above the liquid inlet 134, the air may try to enter the refill container 104 through the liquid passage 116, which would prevent liquid from entering the reservoir 106 through the liquid passage 116. The air inlet 136 and the liquid outlet 134 can, however, be disposed in any suitable manner relative to each other that allows liquid to enter the reservoir 106 through the liquid passage 116 and air to enter the refill container 104 through the air passage 118.

Transfer of liquid from the reservoir 106 and into the pump chamber 120 can also create a negative pressure in the reservoir 106. In order to prevent the reservoir 106 from collapsing, in various embodiments, the reservoir 106 is vented to allow air into the reservoir 106 during priming of the pump 108. In some embodiments, the pump 108 is a vented pump that includes a vent 122 for allowing air into the reservoir 106. Exemplary embodiments of vented pumps are identified in the patents incorporated herein. In certain embodiments, a vent (not shown) is disposed on a wall of the reservoir 106 that allows air to enter the reservoir 106 during priming of the pump 108. The vent can take any suitable form, such as, for example, any form, such as, for example, the form of the components described in the patents incorporated herein.

Figure 2:
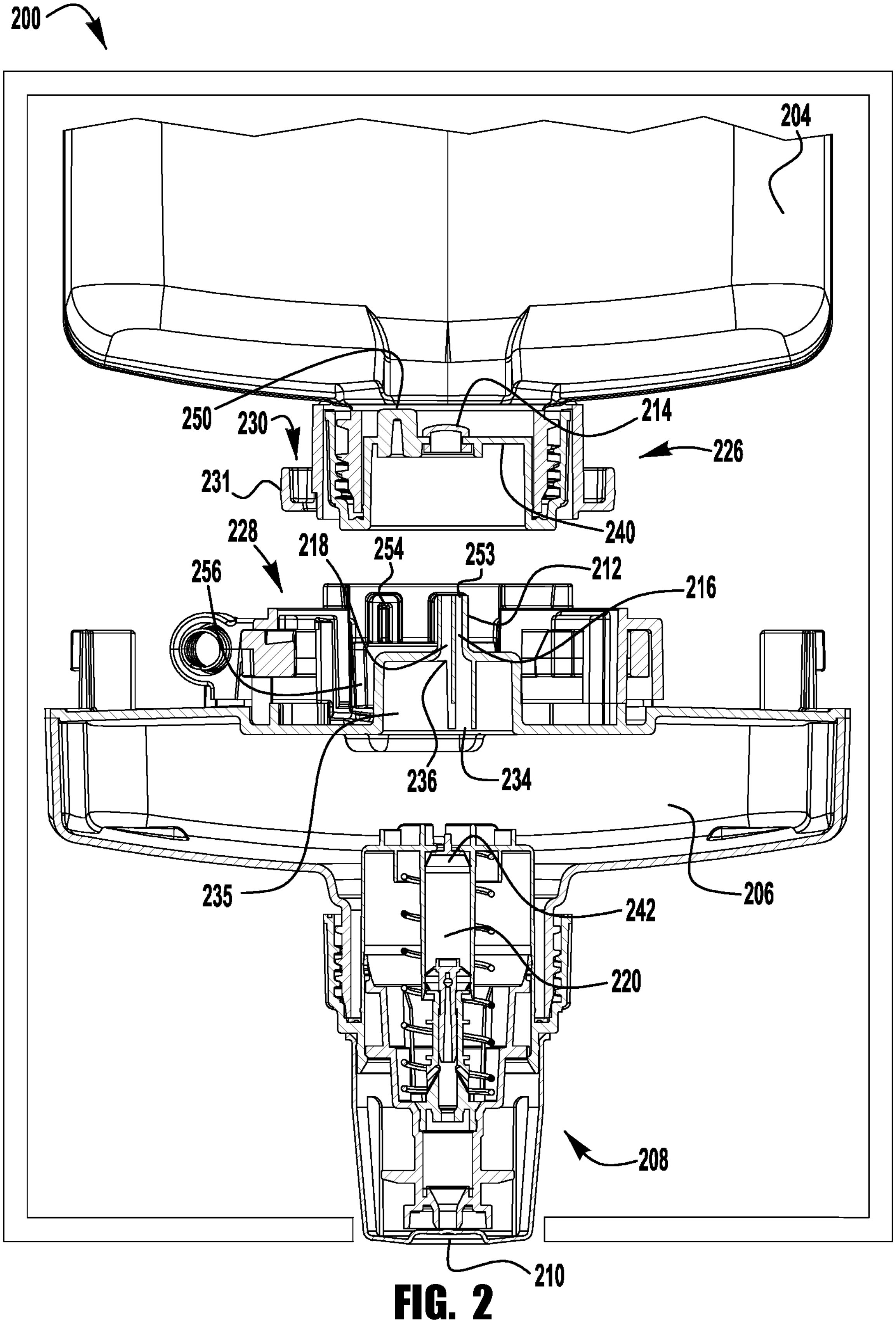
FIG. 2 is a partial cross-sectional view of an exemplary fluid dispenser having a reservoir/pump and a refill container, in which the refill container is not attached to the reservoir and the reservoir is not installed in a dispenser.
Figure 3:
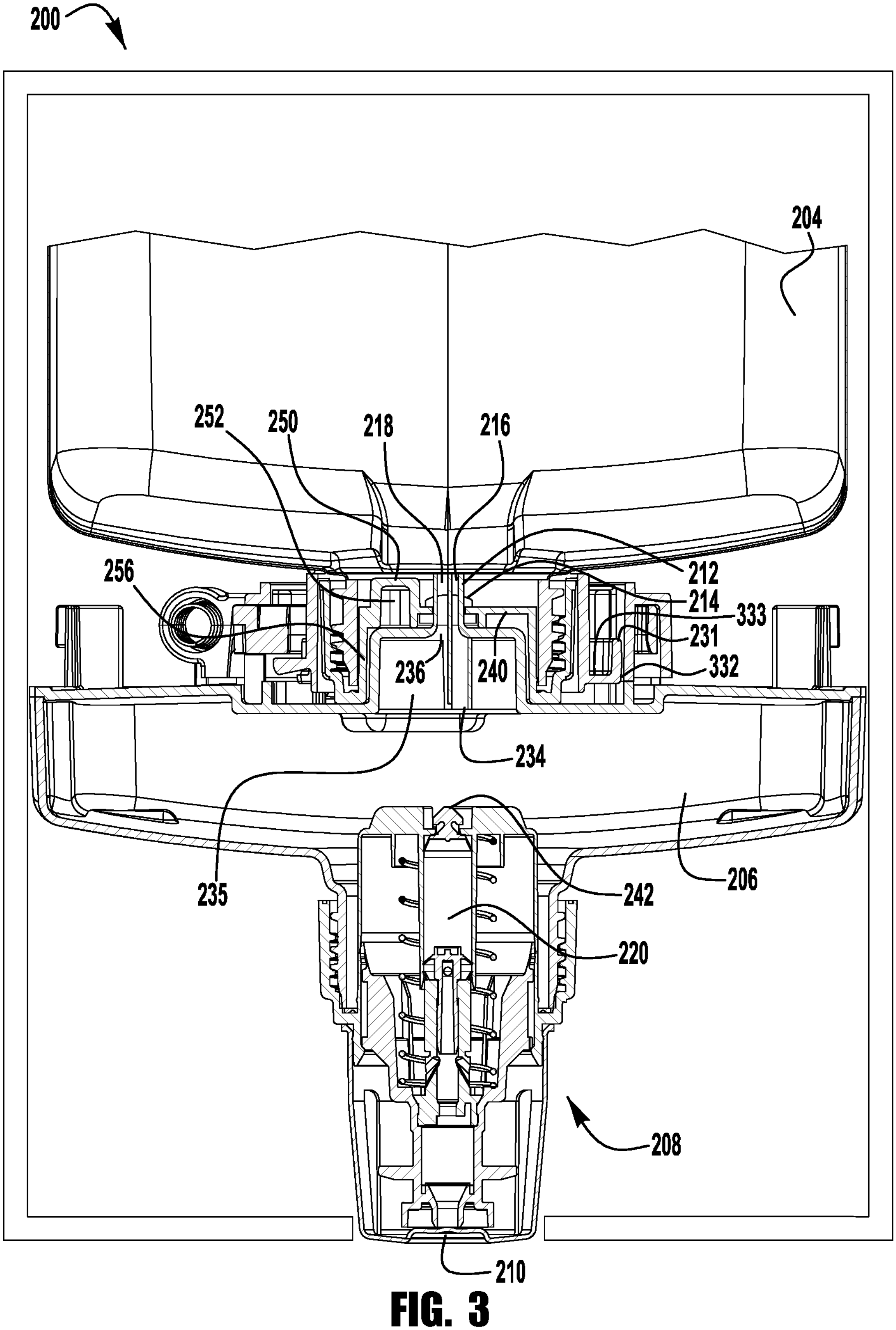
FIG. 3 is a partial cross-sectional view of the exemplary fluid dispenser of FIG. 2, in which the refill container is attached to the reservoir.
Figure 4:
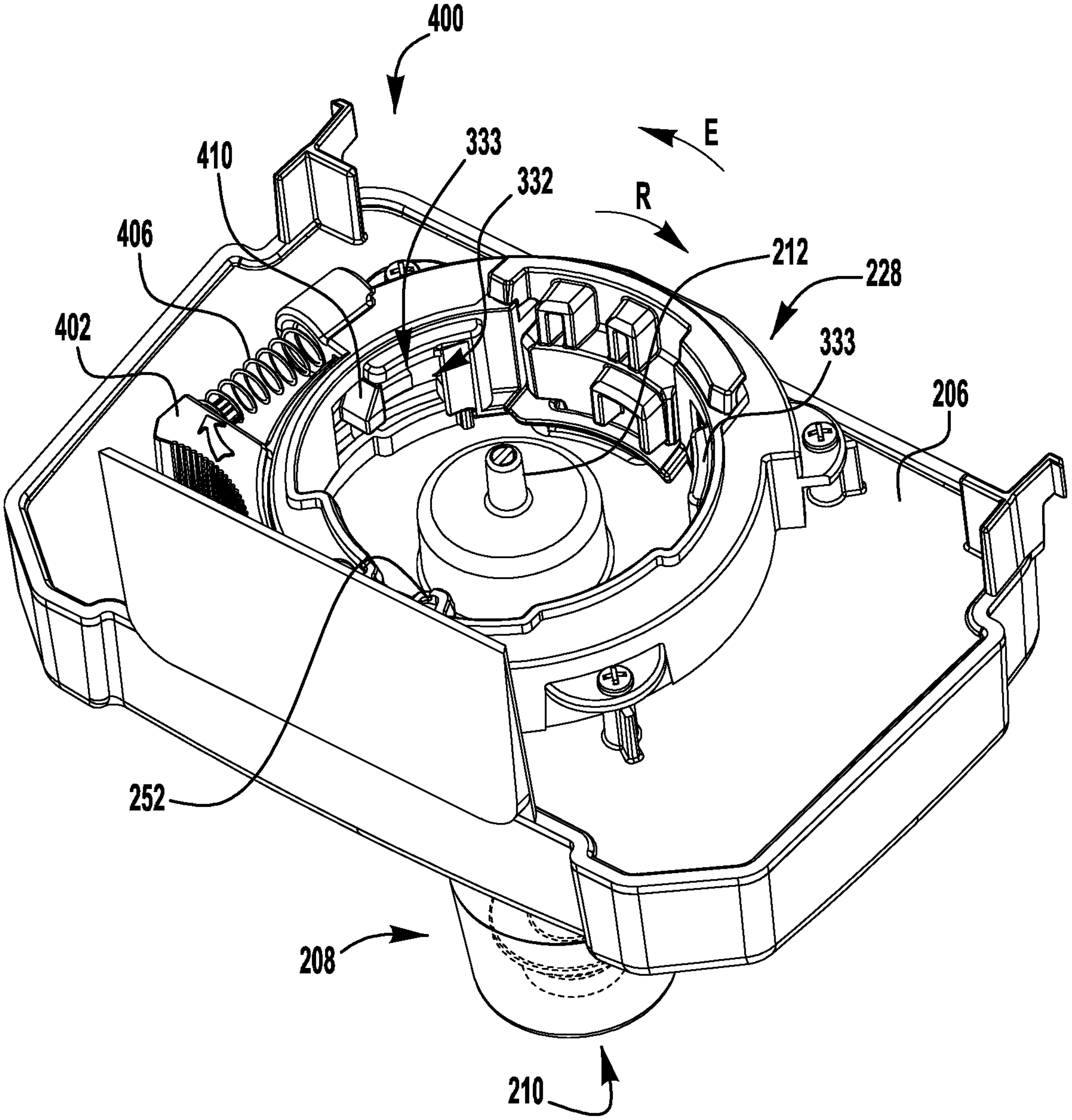
FIG. 4 is a perspective view of the exemplary reservoir of the fluid dispenser of FIG. 2.

Referring to FIGS. 2-4, a fluid dispenser 200 including a refill container 204 and a reservoir 206 with a pump 108 are illustrated. Reservoir 206 and pump 208 are semi-permanently secured in a dispenser (not shown). The reservoir 206 and pump 208 are "semi-permanently" secured, is meant to mean that the reservoir 206 and pump 208 may be easily removed from the dispenser (not shown) by a quick release mechanism (not shown), however, the reservoir 206 and pump 208 are retained in the dispenser and are only periodically removed and replaced. During normal operation reservoir 206 and pump 208 stay with the dispenser when refill units 204 are removed and replaced.

In some exemplary embodiments, the refill container 204 includes a neck portion 226 that is configured to connect to a receiving portion 228 of the reservoir 206. The neck portion 226 of the refill container 204 includes an attachment element 230 that is configured to engage an groove portion 332 (FIGS. 3 and 4) of the receiving portion 228 of the reservoir 206 to secure the refill container 204 to the reservoir 206.

In the illustrated embodiment, receiving portion 228 includes a rotatable locking member 400 (FIG. 4). Rotatable locking member includes a release tab 402. Release tab 402 is biased in its resting position shown in FIG. 4 by a biasing member 406. Release tab 402 may be rotated in direction R which moves retention members 333, which include groove portions 332, in direction R out of the way and allows refill container 204 to be removed from the dispenser (not shown) by moving the refill container 204 upward. The refill container 204 may be installed by rotating the release tab 402 in direction R and lowering the refill container 206 downward so that engagement member 212 engages sealing member 214. Sealing member 214 seals refill container 204 when refill container 204 is not installed in the dispenser (not shown) and in fluid communication with reservoir 206. Sealing member may be, for example, a valve, such as, for example, a shuttle valve that is moved by engagement member 212, or such as, for example, a slit valve, or the like.

Referring to FIG. 2, the neck portion 226 of the refill container 204 includes an inner wall 240 and a sealing member 214 that are configured to seal the interior of the refill container 204 until the refill container is connected to the reservoir 206. In the illustrated embodiment, the sealing member 214 is a silicone seal. However, the sealing member 214 can take any suitable form, such as, for example, any form described in the present application. The receiving portion 228 of the reservoir 206 includes an engagement member 212, a liquid passage 216, and an air passage 218. In the illustrated embodiment, the engagement member 212 is a post, and the liquid passage 216 and the air passage 218 are disposed within the post. However, the engagement member 212 can take any suitable form, such as, for example, any form described in the present application. The engagement member 212 is configured to engage the sealing member 214 such that the sealing member 214 opens to allow the refill container 204 to be in fluid communication with the reservoir 206 as shown in FIG. 3.

In addition, in some embodiments, refill container 204 includes a vent valve 250. Vent valve 250 may be any type of valve configured to allow air to enter refill container 204 and prevents fluid from flowing out of refill container 204. In some exemplary embodiments, vent valve 204 may be a mushroom valve, a flapper valve, a wiper valve, a ball and spring valve, a slit valve or the like. In some embodiments, the vent valve 250 is configured to allow air to flow into refill container 204 only after a selected vacuum pressure is achieved in the refill container 204. In some embodiments, vent valve 250 engages vent member 253 and only after engaging vent member 253 is vent valve 250 permitted to open and allow air to flow into the refill container 204. Preferably, vent valve 250 is configured to require a minimum vacuum pressure inside of refill container 204 before allowing air from the atmosphere to flow into the container. Vent member 253 has an opening 254 in its top and includes a vent passage 256 that extends to the atmosphere.

Referring to FIG. 3, connection of the refill container 104 to the reservoir 106 causes the engagement member 112 to engage and open the sealing member 114 such that the engagement member 112 extends into the refill container 104. When the engagement member 112 extends into the refill container 104, the liquid passage 116 and the air passage 118 of the reservoir 106 both extend into the refill container 104 such that the refill container is in fluid communication with the reservoir 106. Sealing member 214 seals around engagement member 212 and prevents leaking of fluid. When refill container 206 is removed, sealing member 214 disengages with engagement member 212 and seals, which prevents residual fluid in refill container 204 from leaking out.

The reservoir 206 is in fluid communication with a pump 208 that includes a pump chamber 220. In the illustrated embodiment, the pump 208 is a piston pump, but, in other embodiments, the pump can take any other suitable form, such as, for example, any form described in the present application. A one-way liquid inlet valve 242 is disposed between the reservoir 206 and prevents liquid in the pump chamber 220 from moving back into the reservoir 206.

Referring to FIG. 3, during operation, activation of the pump 208 causes liquid in the pump chamber 220 to be pumped out through the outlet nozzle 210. Subsequently, on the return stroke, the pump 208 is primed, which causes liquid in the reservoir 206 to flow past the one-way liquid inlet valve 242 and into the pump chamber 220. This movement of liquid from the reservoir 206 and into the pump chamber 220 causes liquid to flow from the refill container 204 and into the reservoir 206 through the liquid passage 216. The movement of liquid from the refill container 204 creates a negative pressure in the refill container 204, which causes any air in the reservoir 206 to flow from the reservoir 206 and into the refill container 204. Air that is in reservoir 206 flows to the highest point, which is in cavity 235. The inlet end 236 of air passage 218 is located at the top of cavity 235 which is above the outlet end 234 of liquid passage 216. This helps insure that air is transferred up into refill container 206 as opposed to liquid.

This movement of air into the refill container 204 ensures that air is not drawn in to liquid pump chamber 220 during subsequent operation of pump 208 and helps to prevent collapsing of the refill container due to this negative pressure. In addition, this movement of air into the refill container 204 will allow liquid to more easily flow from the reservoir 206 and into the pump chamber 220.

If there is no air in the liquid reservoir 206, or the vacuum pressure in refill container 204 is greater than a selected cracking pressure of vent valve 254, vent valve 254 opens and allows air from the atmosphere to flow into refill container 206. Once the vacuum pressure in refill container 226 drops below the cracking pressure of vent valve 254, vent valve 254 closes.

The air inlet 236 of the air passage 218 is disposed above the liquid outlet 234 of the liquid passage when the fluid dispenser 200 is in use, which prevents air lock from occurring. That is, as discussed above, priming or charging of the pump 208 causes liquid to flow from the refill container 204 and into the reservoir 206 through the liquid passage 216, and causes air to move from the reservoir 206 and into the refill container 204 through the air passage 218. In some situations, if the air inlet 236 is not located above the liquid outlet 234, air may attempt to move from the reservoir 106 and into the refill container 204 through the liquid passage 216, which may prevent liquid from flowing into the reservoir 206 through the liquid passage 216.

Figure 5:
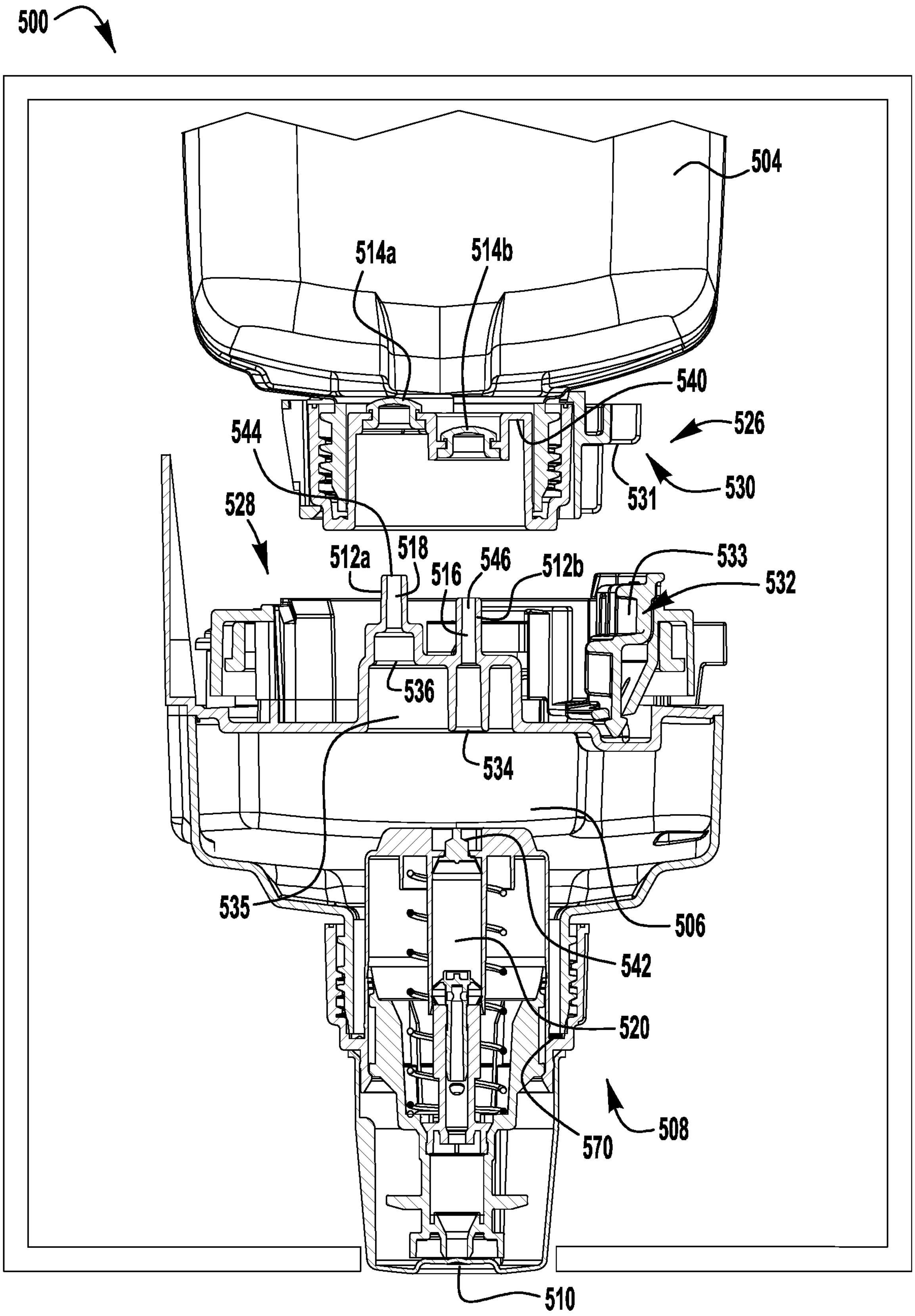
FIG. 5 is a partial cross-sectional view of another exemplary embodiment of a fluid dispenser having a reservoir and a refill container, in which the refill container is not attached to the reservoir.
Figure 6:
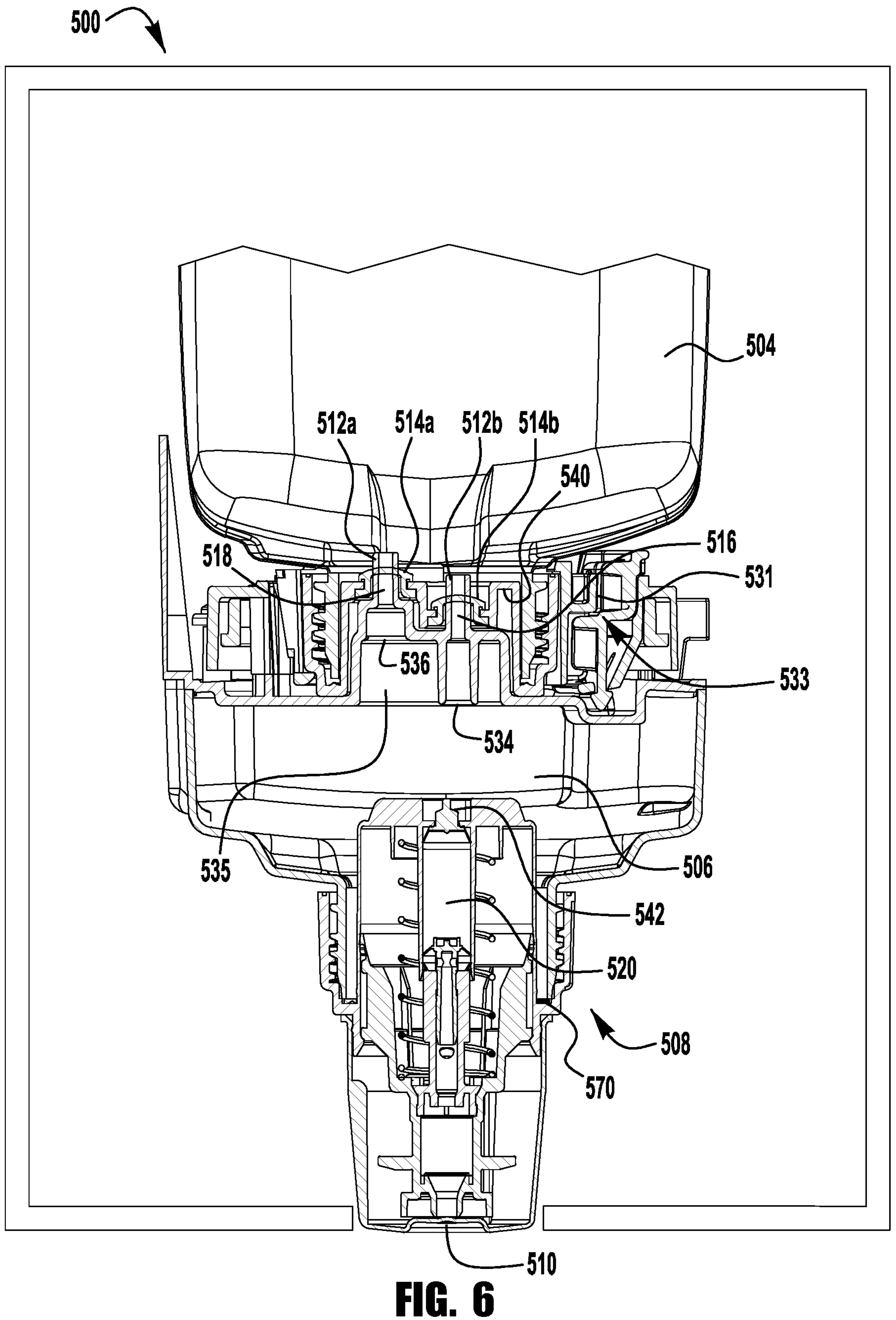
FIG. 6 is a cross-sectional view of the exemplary fluid dispenser of FIG. 5, in which the refill container is attached to the reservoir.
Figure 7:
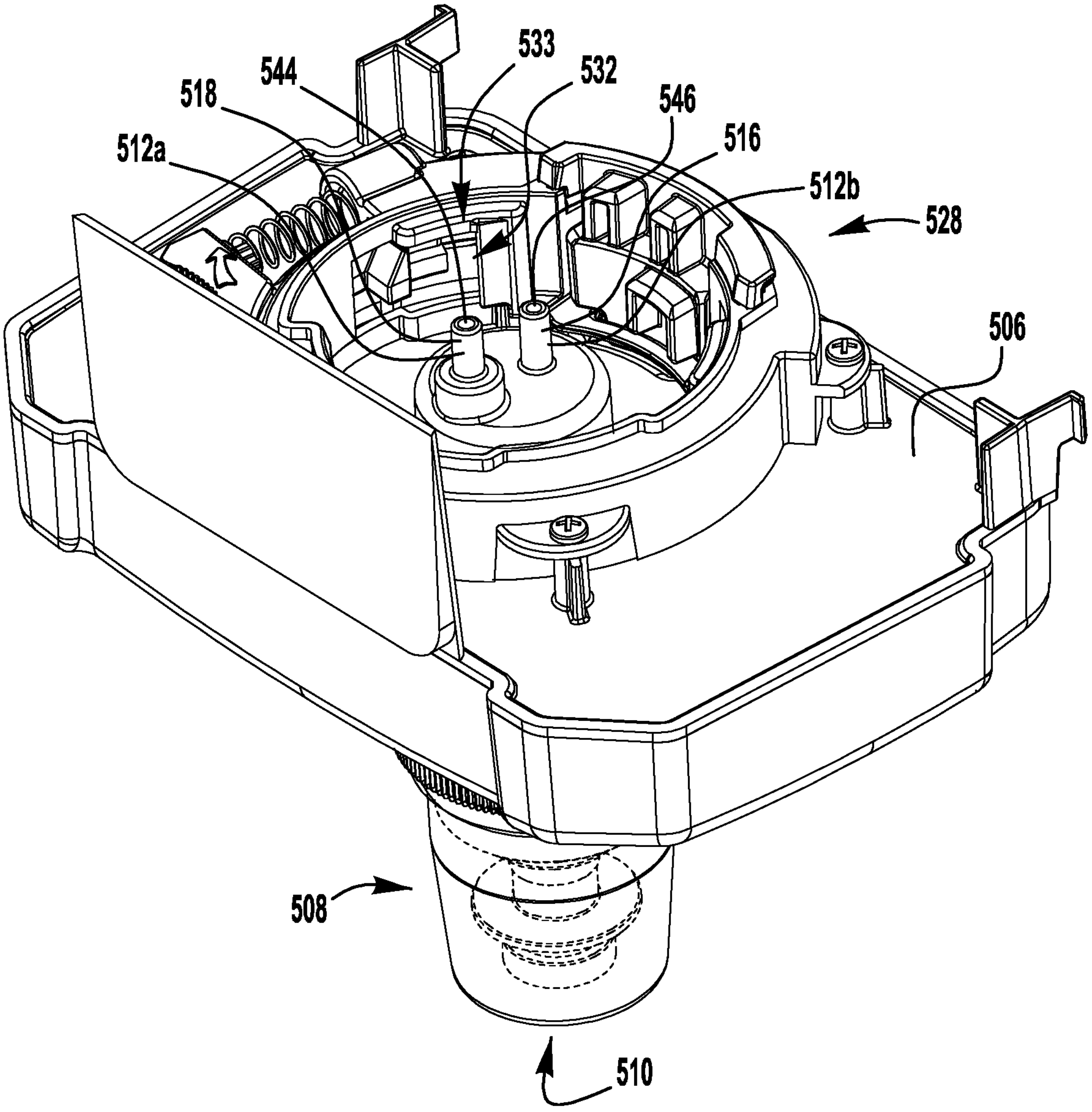
FIG. 7 is a perspective view of the exemplary reservoir of the fluid dispenser of FIG. 5.

Referring to FIGS. 5-7, in certain embodiments, a fluid dispenser 500 having a refill container 504 is disclosed. The refill container 504 includes a neck portion 526 that is configured to connect to a receiving portion 528 of the reservoir 506. The neck portion 526 of the refill container 504 includes an attachment element 530 that is configured to engage an attachment element 532 of the receiving portion 528 of the reservoir 506 to secure the refill container 54 to the reservoir 506. In the illustrated embodiment, the refill container 504 is secured to and released from in the same manner as described above with respect to FIG. 2-4.

Referring to FIG. 5, the neck portion 526 of the refill container 504 includes an inner wall 540, a first sealing member 514*a*, and a second sealing member 514*b* that are configured to seal the interior of the refill container 504 when the refill container 504 is not connected to the reservoir 106. In the illustrated embodiment, the sealing members 514*a,b* are a silicone seals. However, the sealing members 514*a,b* can take any suitable form, such as, for example, any form described in the present application. The receiving portion 528 of the reservoir 506 includes a first engagement member 512*a*, a second engagement member 512*b*, a liquid passage 516, and an air passage 518. In the illustrated embodiment, the engagement members 512*a,b* are posts, and the liquid passage 516 is disposed within the first engagement member 512*a* and the air passage 518 is disposed within the second engagement member 512*b*. However, the engagement members 512*a,b* can take any suitable form, such as, for example, any form described in the present application. The first engagement member 512*a* is configured to engage the first sealing member 514*a* such that the first sealing member opens to allow the air passage 518 of the reservoir 506 to be in fluid communication with the refill container 504. The second engagement member 512*b* is configured to engage the second sealing member 512*b* such that the second sealing member opens to allow the liquid passage 516 of the reservoir 506 to be in fluid communication with the refill container 504. Pump 508 is a venting pump and includes a vent valve 570 that allows air to flow into the reservoir 506 when there is a sufficient vacuum pressure created in the refill container 504 and reservoir 506.

Referring to FIG. 6, connection of the refill container 504 to the reservoir 506 causes the engagement members 512*a,b* to engage and open the sealing members 514*a,b* such that the engagement members 512*a,b* extend into the refill container 504. Sealing members 514*a,b* seal around engagement members 512*a,b* to prevent leaking. When the engagement members 512*a,b* extend into the refill container 504, the liquid passage 516 and the air passage 518 of the reservoir 506 both extend into the refill container 504 such that the refill container is in fluid communication with the reservoir 506.

The first sealing member 514*a* is disposed above the second sealing member 514*b* on the refill container 504, and a top portion 544 of the first engagement member 512*a* is disposed above a top portion 546 of the second engagement member 512*b* on the reservoir 506. In this embodiment, the engagement members 512*a,b* and the sealing members 514*a,b* can act as a key for the fluid dispenser 100. That is, a refill container that does not have the above-mentioned configuration (i.e., the configuration of refill container 504 in FIGS. 5-6) may not be able to attach to the reservoir 506, which prevents user's from replacing the refill container 504 with a refill container that does not have the above-mentioned configuration. In other embodiments, sealing members 514*a,b* can be disposed at the same height, or the second sealing member 514*b* can be disposed above the first sealing member 514*a*. The top portions 544, 546 of the engagement members 512*a*, 512*b* can also be disposed at the same height, or preferably, the top portion 546 of the second engagement member 512*b* can be disposed below the top portion 544 of the first engagement member 512*a*. In addition, reservoir 506 includes a cavity 535 that creates a space for air to accumulate at the top of the reservoir 506. The inlet 536 to air passage 518 is located at the top of cavity 535. Location of the air inlet 536 of air passage 518 helps to ensure air flows through air passage 518 into refill container 504 rather than liquid.

Referring to FIGS. 5 and 6, the reservoir 506 is in fluid communication with a pump 508 that includes a pump chamber 520. In the illustrated embodiment, the pump 508 is a piston pump, but, in other embodiments, the pump can take any other suitable form, such as, for example, any form described in and incorporated into the specification by reference. A one-way liquid inlet valve 542 is disposed between the reservoir 506 and the pump chamber 520 that allows liquid in the reservoir 506 to enter the pump chamber 520 and prevents liquid in the pump chamber 520 from moving back into the reservoir 506.

During operation, activation of the pump 508 causes liquid in the pump chamber 520 to move through the outlet nozzle 510. Subsequently, the pump 508 is charged, which causes liquid in the reservoir 506 to flow past one-way liquid inlet valve 542 and into the pump chamber 520. This movement of liquid from the reservoir 506 and into the pump chamber 520 causes liquid to move from the refill container 504 and into the reservoir 506 through the liquid passage 516. The movement of liquid from the refill container 504 creates a negative pressure in the refill container 504, which causes air to move from the reservoir 506 and into the refill container 504, and also causes air to flow past vent valve 570 and into the liquid reservoir 506. This movement of air into the refill container 504 prevents collapsing of the refill container due to this negative pressure. In addition, this movement of air into the refill container 504 will allow liquid to more easily move from the reservoir 506 and into the pump chamber 520.

As can be seen in FIG. 6, the air inlet 536 of the air passage 518 is disposed above the liquid outlet 534 of the liquid passage when the fluid dispenser 500 is in use, which prevents air lock from occurring. That is, as discussed above, priming of, or charging, the pump 508 causes liquid to move from the refill container 504 and into the reservoir 506 through the liquid passage 516, and causes air to move from the reservoir 506 and into the refill container 504 through the air passage 518. In some situations, if the air inlet 536 is not located above the liquid outlet 534, air may attempt to move from the reservoir 506 and into the refill container 504 through the liquid passage 516, which may prevent liquid from moving into the reservoir 506 through the liquid passage 516.

Figure 8:
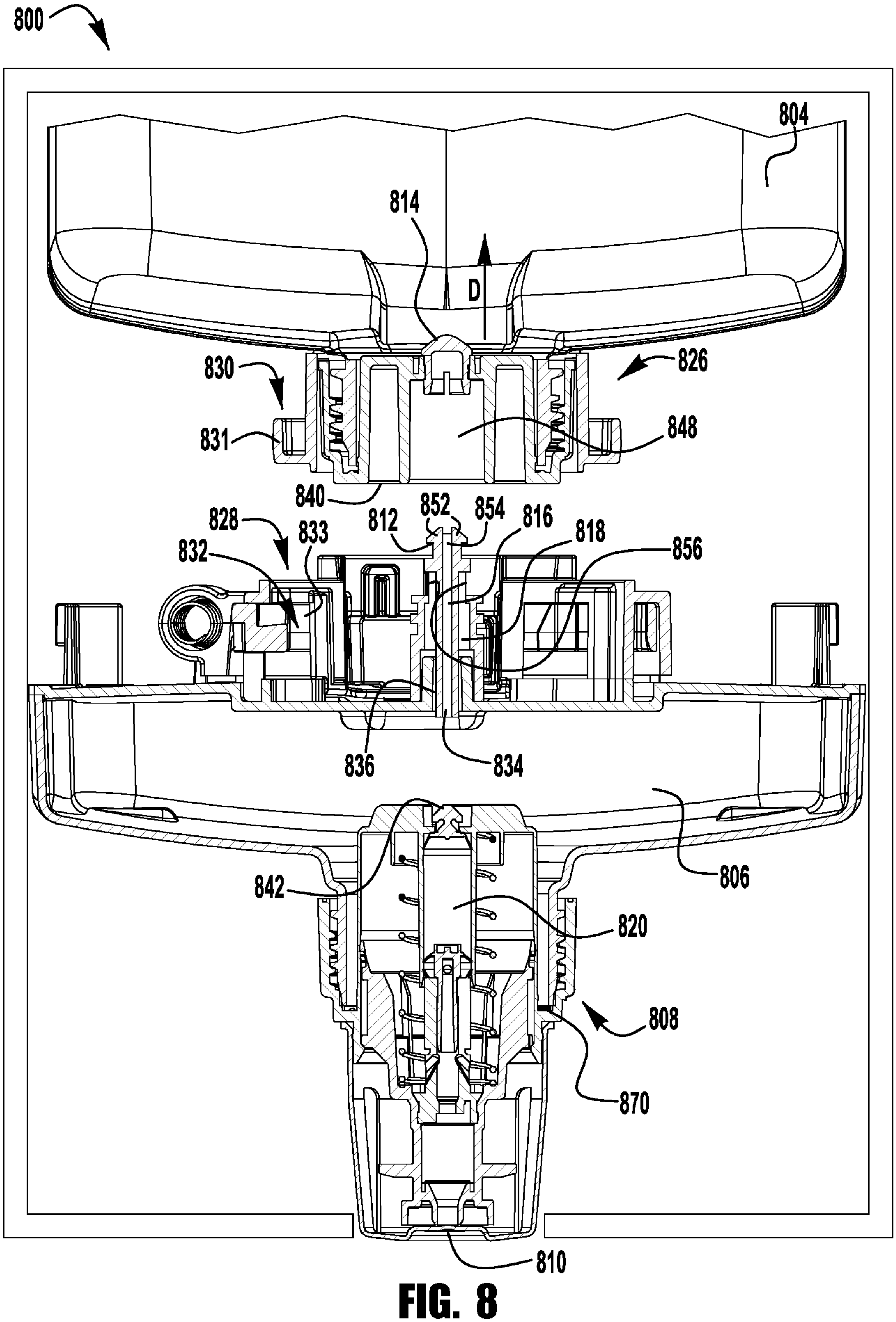
FIG. 8 is a cross-sectional view of yet another exemplary embodiment of a fluid dispenser having a reservoir and a refill container, in which the refill container is not attached to the reservoir.
Figure 9:
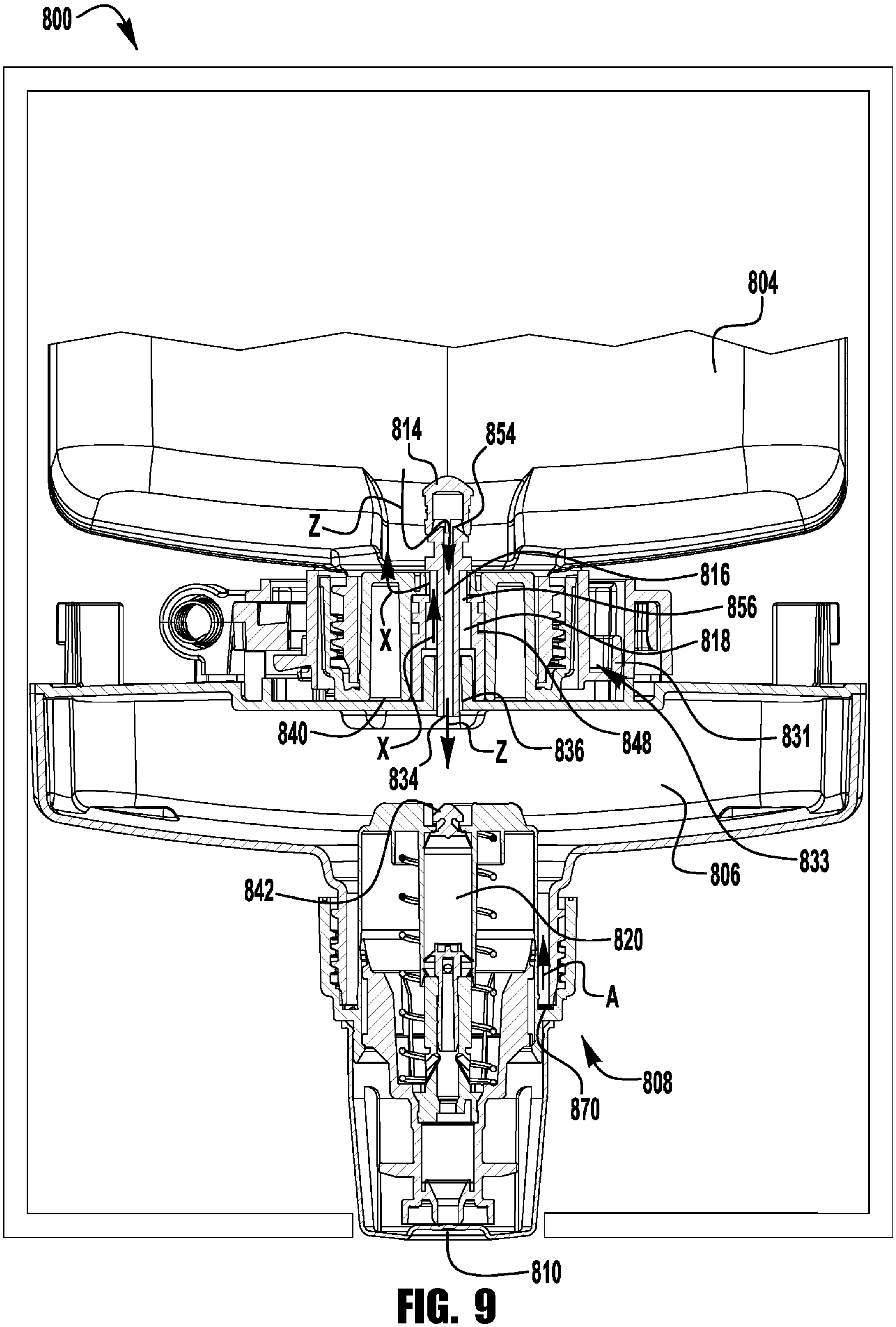
FIG. 9 is a cross-sectional view of the exemplary fluid dispenser having a reservoir and refill container of FIG. 8, in which the refill container is attached to the reservoir.
Figure 10:
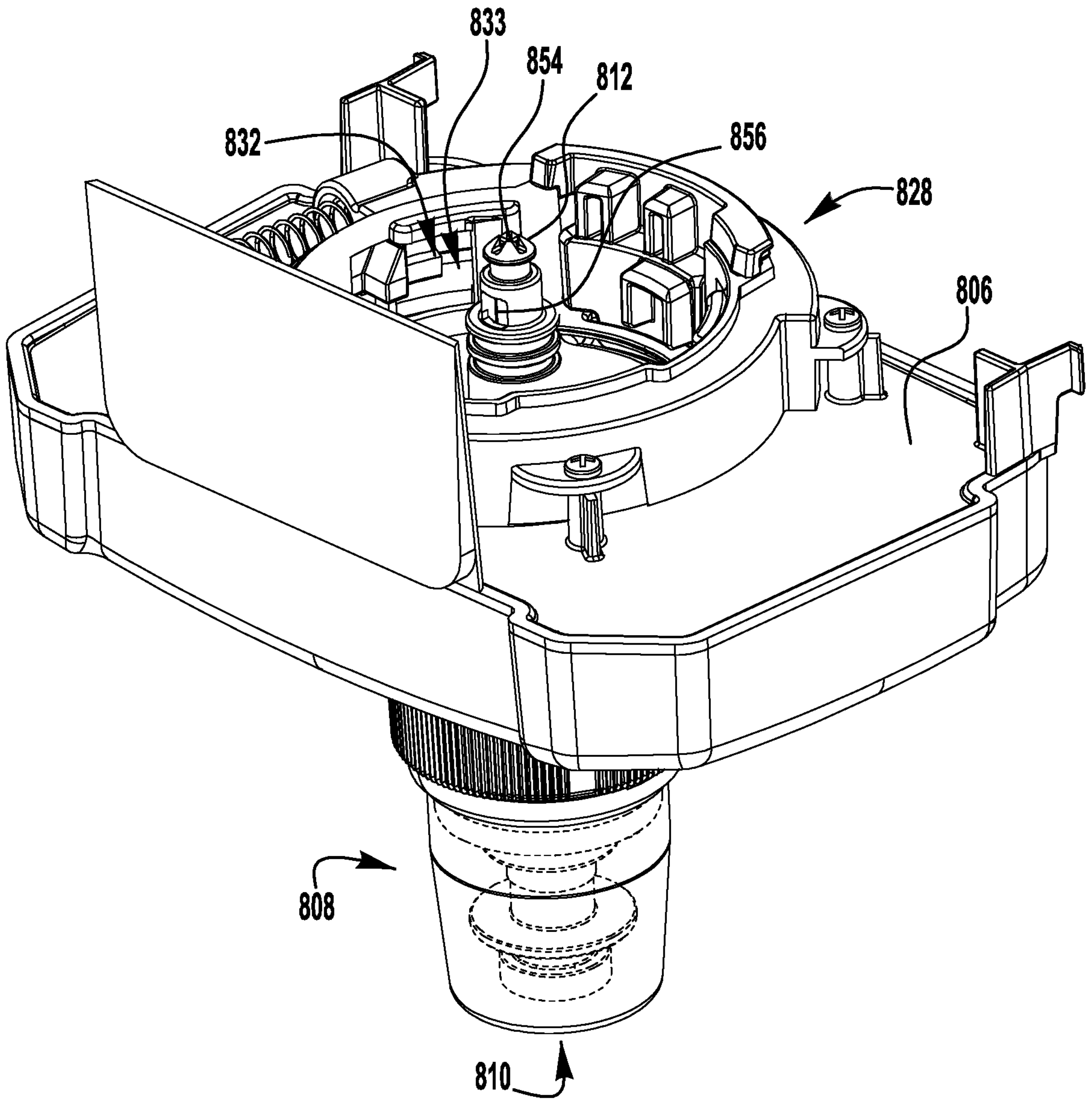
FIG. 10 is a perspective view of the exemplary reservoir of the fluid dispenser of FIG. 8.

Referring to FIGS. 8-10, a dispenser 800 is illustrated. As with dispensers 100, 200 and 500, dispenser 800 is illustrated generically and may be, for example, any of the dispensers incorporated herein (some may require minor modifications). In certain embodiments, the refill container 804 includes a neck portion 826 that is configured to connect to a receiving portion 828 of the reservoir 806. The neck portion 826 of the refill container 804 includes an attachment element 830 that is configured to engage an attachment element 832 of the receiving portion 828 of the reservoir 806 to secure the refill container 804 to the reservoir 806. Like reservoirs and pumps 106, 108, 206, 208 and 506, 508, reservoir 806 and pump 808 are preferably removably secured to dispenser 800 and normally remain in dispenser 800 when refill containers are removed and replaced. However, they may be removed and replaced periodically, such as, for example, upon selected time periods, upon selected throughput, and/or upon failure by one of the components. In the illustrated embodiment, refill container 804 releasably connects to reservoir 806 in the same manner as that described above.

Referring to FIG. 8, the neck portion 826 of the refill container 804 includes an inner wall 840 that defines a passageway 848 and a sealing member 814 disposed in the passageway 848 that seals the interior of the refill container 804 until the refill container 804 is connected to the reservoir 106. In the illustrated embodiment, the sealing member 814 is a poppet seal that is movable between an open position (that allows liquid in the refill container 804 to flow out of the refill container 804, and air in the reservoir 806 to flow into the refill container 804) and a closed position (that prevents liquid from flowing out of the refill container 804, and allows air to flow into the refill container 804 from the reservoir 806).

The receiving portion 828 of the reservoir 806 includes an engagement member 812, a liquid passage 816, and an air passage 818. In the illustrated embodiment, the engagement member 812 is a post, and the liquid passage 816 and the air passage 818 are disposed within the post. More specifically, the liquid passage 816 extends through a center of the engagement member 812, and the air passage 818 extends around the liquid passage 816. The liquid passage 816 and air passage 818 may, however, be disposed within the engagement member 812 in many suitable manners that allows liquid to flow from the refill container 804 and into the reservoir 106, and allows air to flow from the reservoir 806 and into the refill container 804. In other embodiments, the engagement member 812 can take other suitable forms, such as, for example, other forms described in the present application.

The engagement member 812 is configured to engage the poppet seal 814 such that the poppet seal moves from the closed position (as shown in FIG. 8) to the open position (as shown in FIG. 9) in the direction D. In certain embodiments, engagement between the engagement member 812 and the poppet seal 814 causes the engagement member 812 to connect to the poppet seal 814. In the illustrate embodiment, the poppet seal 814 includes a receiving connection member 850, and the engagement member 812 includes a protruding connection member 852. The protruding connection member 852 of the engagement member 812 is configured to snap into the receiving connection member of the poppet seal 814 to secure the engagement member 812 to the poppet seal 814 immediately prior to moving the poppet seal 814. The engagement member 812 and the poppet seal 814 can, however, be connected in other suitable manners and in some embodiments a cage (not shown) at least partially surrounds the poppet valve 814 to ensure the poppet valve 814 does not travel very far up into the refill container 804 so that in the event the poppet seal 814 comes loose from the engagement member 812 prematurely, the poppet valve 814 reseats itself and seals the refill container 814 upon removal of the refill container 804.

Referring to FIG. 9, when the engagement member 912 is connected to the poppet seal 814 such that the poppet seal is in the open position, the engagement member 812 extends through the passageway 848 and into the refill container 804. When the engagement member 812 extends into the refill container 804, both the liquid passage 816 and the air passage 818 are in fluid communication with the refill container 804. Liquid will enter the liquid passage 816 and move into the reservoir 806 in the direction Z. That is, liquid will enter a liquid inlet 854 of the liquid passage and exit the liquid outlet 834 into the reservoir 806. Air will enter the air passage 818 and move into the refill container 804 in the direction X. That is, air will enter the air inlet 836 of the air passage and exit an air outlet 856 into the refill container 804. In addition, due to the vacuum pressure created in the reservoir 806 and refill container 804, air flows past vent valve 870 and up into reservoir 806 in direction A.

Referring to FIGS. 8 and 9, the reservoir 806 is in fluid communication with a pump 808 that includes a pump chamber 820. In the illustrated embodiment, the pump 808 is a piston pump, but, in other embodiments, the pump can take any other suitable form, such as, for example, any form described in the present application. A one-way liquid inlet valve 242 is disposed between the reservoir 806 and the pump chamber 820 and allows liquid to flow from the reservoir 806 into the pump chamber 820 and prevents liquid in the pump chamber 820 from moving back into the reservoir 806.

Referring to FIG. 9, during operation, activation of the pump 808 causes liquid in the pump chamber 820 to move through the outlet nozzle 810. Subsequently, the pump 808 is primed or charged, which causes liquid in the reservoir 806 to move past one-way liquid inlet valve 842 and into the pump chamber 820. This transfer of liquid from the reservoir 806 and into the pump chamber 820 causes liquid to flow from the refill container 804 and into the reservoir 806 through the liquid passage 816 in the direction Z. The movement of liquid from the refill container 804 creates a negative pressure in the refill container 804, which causes air to flow from the reservoir 806 and into the refill container 804 in the direction X and movement of air past vent valve 870 into reservoir 806. This movement of air into the refill container 804 prevents collapsing of the refill container 804 due to this negative pressure. In addition, this movement of air into the refill container 804 nay allow liquid to more easily move from the reservoir 806 and into the pump chamber 820.

Still referring to FIG. 9, the air inlet 836 of the air passage 818 is disposed above the liquid outlet 834 of the liquid passage when the fluid dispenser 800 is in use, which prevents air lock from occurring. That is, as discussed above, charging of the pump 808 causes liquid to move from the refill container 804 and into the reservoir 806 through the liquid passage 816, and causes air to move from the reservoir 806 and into the refill container 804 through the air passage 818. In some situations, if the air inlet 836 is not located above the liquid outlet 834, air may attempt to move from the reservoir 806 and into the refill container 804 through the liquid passage 816, which may prevent liquid from moving into the reservoir 806 through the liquid passage 816.

In some embodiments, refill containers disclosed herein are collapsible. In such embodiments, a vent valve may not be required to vent the container. Any air that is in the reservoir, however, is still able to transfer up into the refill container. Transferring air up into the refill container may prevent air in the reservoir from causing malfunctions, causing inconsistent dosing, causing air lock or the like.

The various embodiments described herein are advantageous because they allow a user to remove a refill container from a fluid dispenser when the refill container is empty, but still allow a user to obtain soap, sanitizer, lotion, etc. from the fluid dispenser because of the liquid that remains in the reservoir. With traditional systems, a maintenance staff may choose to replace a refill container while some liquid remains in the refill container to prevent a situation in which the container is empty and a user attempts to use the fluid dispenser and does not obtain any fluid product. These situations lead to waste of the liquid that remains in the replaced refill container. The embodiments described herein prevents this waste because of the liquid that remains in the reservoir.

Figure 11:
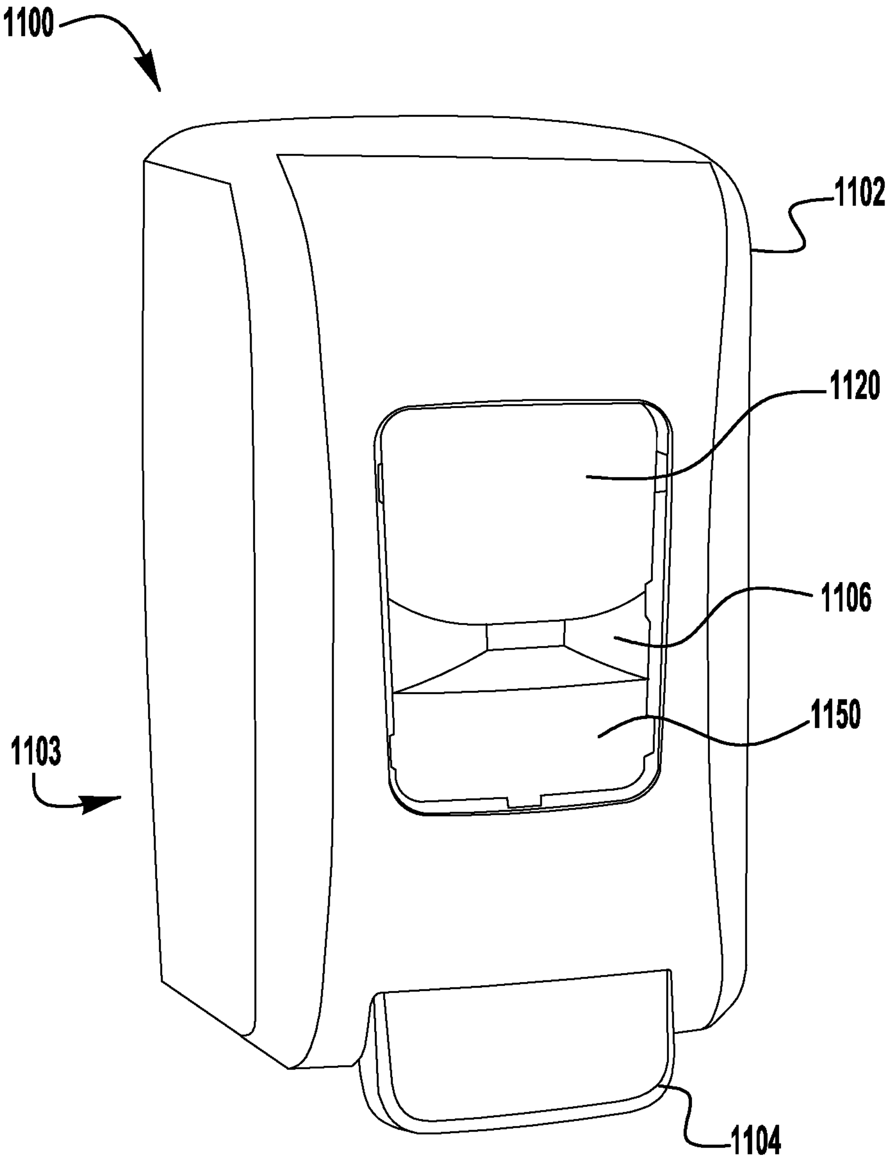
FIG. 11 is prospective view of another exemplary dispenser.
Figure 12:
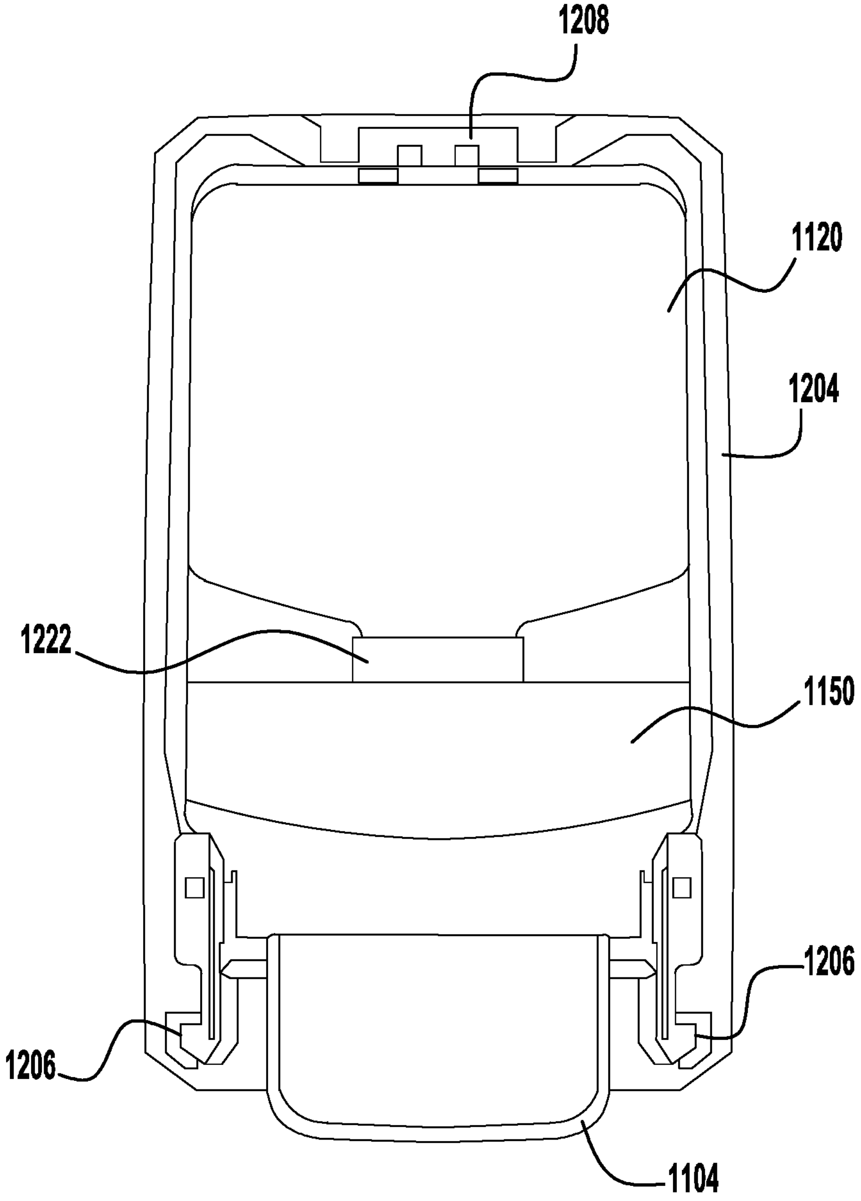
FIG. 12 is a front view of the exemplary dispenser with the cover removed.

FIG. 11 is an exemplary dispenser 1100. Dispenser 1100 includes a housing 1102 having a front cover 1103. Front cover 1103 is hingedly connected to back place 1204 (FIG. 12) by hinge pins 1206. Front cover 1103 is held in a closed position by catch 1208 when the dispenser 1100 is ready for use. Catch 1208 may be released allowing front cover 1103 to rotate about hinge pins 1206 to provide access to refill unit 1120 and semi-permanent reservoir 1150. As discussed above, semi-permanent reservoir 1150 typically remains with dispenser when the refill unit 1120 is removed and replaced, but may itself be replaced periodically, or when a component of the reservoir or pump fails. In some embodiments, reservoir 1150 and pump 1402 are secured to the dispenser 1100 by a quick release mechanism, such as, for example, the rotatable quick release mechanism described above.

In addition, dispenser 1100 includes a window 1106 in front cover 1103. In some embodiments, window 1106 is configured so that a user can see at least a portion of the refill unit 1120 and at least a portion of semi-permanent reservoir 1150. Dispenser 1100 is manual dispenser and as a push-bar 1104. In some exemplary embodiments, dispenser 1100 is a touch free dispenser. In such an embodiment, dispenser 1100 would include a sensor (not shown) for sensing a user's hand, and an actuator powered by a battery or some other power source that actuates pump 1402 to dispense the product.

Figure 13:
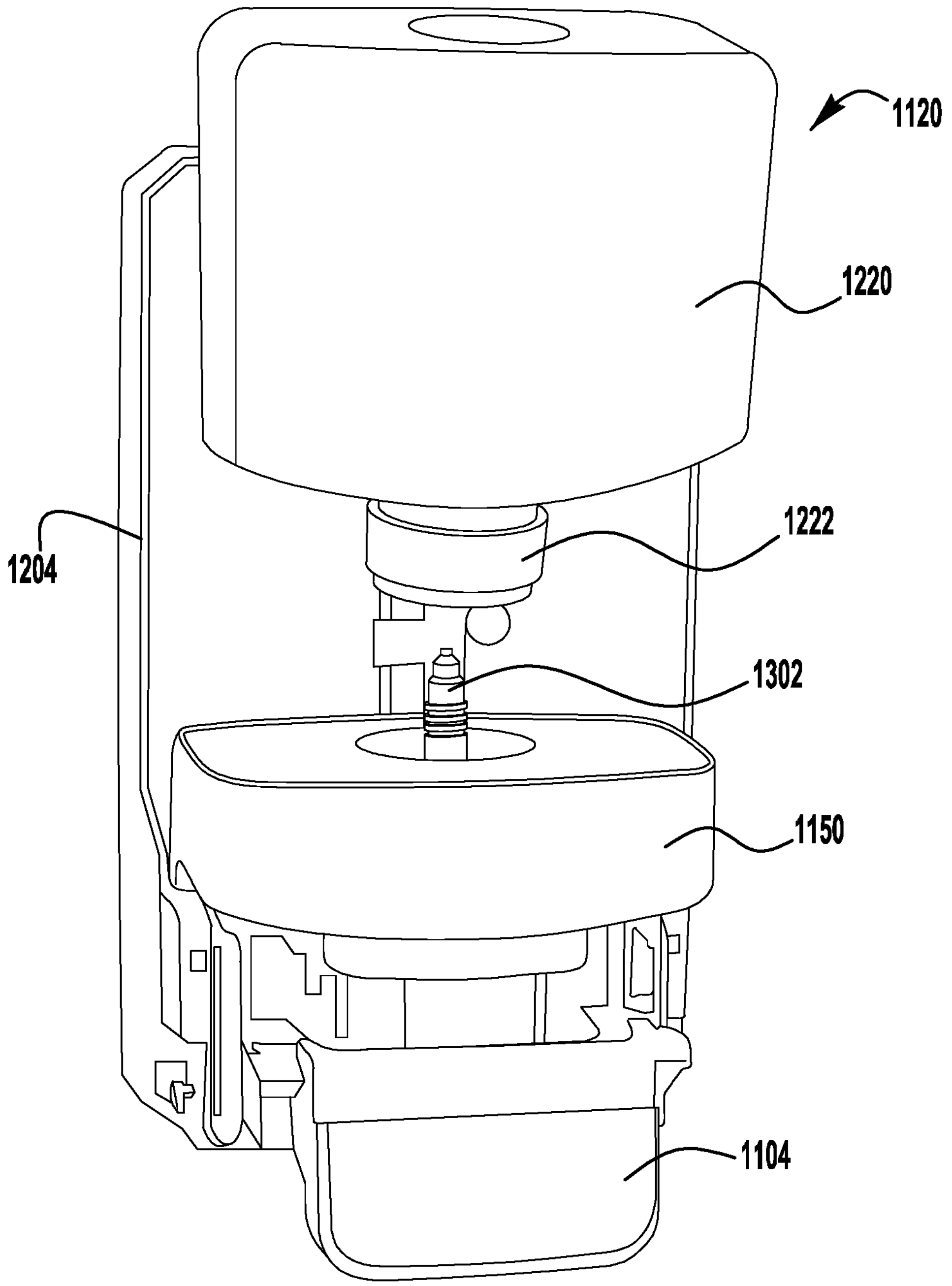
FIG. 13 is a front view of the exemplary dispenser with the refill unit being removed leaving the semi-permanent reservoir and pump connected to the dispenser.

FIG. 13 is a perspective view of dispenser 1100 with the cover 1103 removed and showing the refill unit 1120 being separated from the semi-permanent reservoir 1150. Refill unit 1120 includes a container connector 1222, which is a female connector, and it connects to connector 1302, which is a male connector on semi-permanent reservoir 1150. An exemplary connector is shown in U.S. Pat. No. 6,126,045, titled "Connector Assembly For A Fluid Connection" was filed on Jan. 11, 2000 and is incorporated herein by reference in its entirety. In some embodiments, the refill unit 1120 includes container 1220 and connector 1222. In most cases, refill unit 1120 can be completely drained of fluid prior to removal from the dispenser 1100 because semi-permanent reservoir 1150 contains enough fluid that there is little to no danger of the dispenser 1100 being emptied prior to the refill unit 1120 being replaced.

To separate refill unit 1120 from semi-permanent reservoir 1150, the user simply lifts refill unit 1120 upward. To connect refill unit 1122 to semi-permanent reservoir 1150, the user merely aligns connector 1222 with male connector 1302 and lowers refill 1120 in place. In some embodiments, dispenser 1100 includes a socket or bracket (not shown) for receiving and holding refill unit 1120 in place.

In some embodiments, the semi-permanent reservoir 1150 has less than about ⅛th of the volume of the refill unit container 1120. In some embodiments, the semi-permanent reservoir 1150 has less than about ¼th of the volume of the refill unit container 1120. In some embodiments, the semi-permanent reservoir 1150 has less than about ⅓rd of the volume of the refill unit container 1120.

Figure 14:
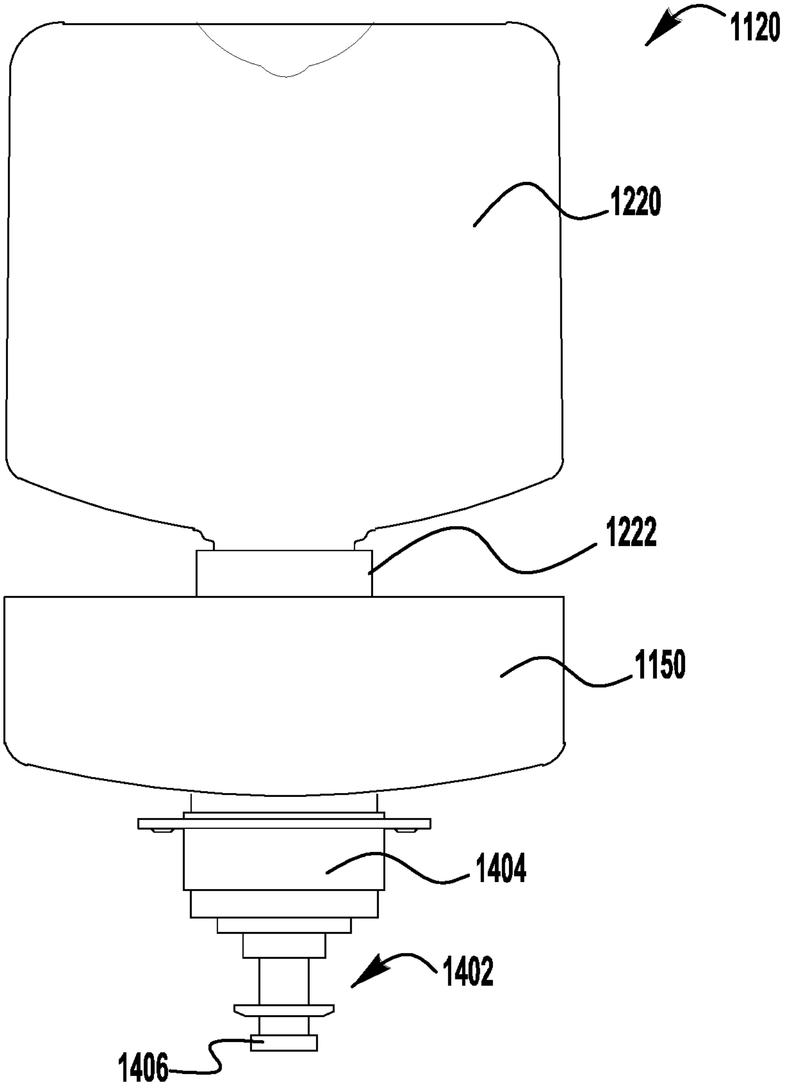
FIG. 14 is an exemplary embodiment of the refill unit and semi-permanent reservoir and pump removed from the dispenser.

FIG. 14 illustrates the refill unit 1120 and semi-permanent reservoir 1120 (and pump 1402) removed from dispenser 1100. This can be accomplished by pressing a release mechanism (not shown) that releases semi-permanent reservoir 1150 in pump 1402 from the dispenser 1100. Located around pump 1402 is keyed collar 1404. Keyed collar 1404 may be used to insure the proper refill is installed in dispenser 1100. In this exemplary embodiment, pump 1402 is a foam pump and has an outlet 1406.

Figure 15:
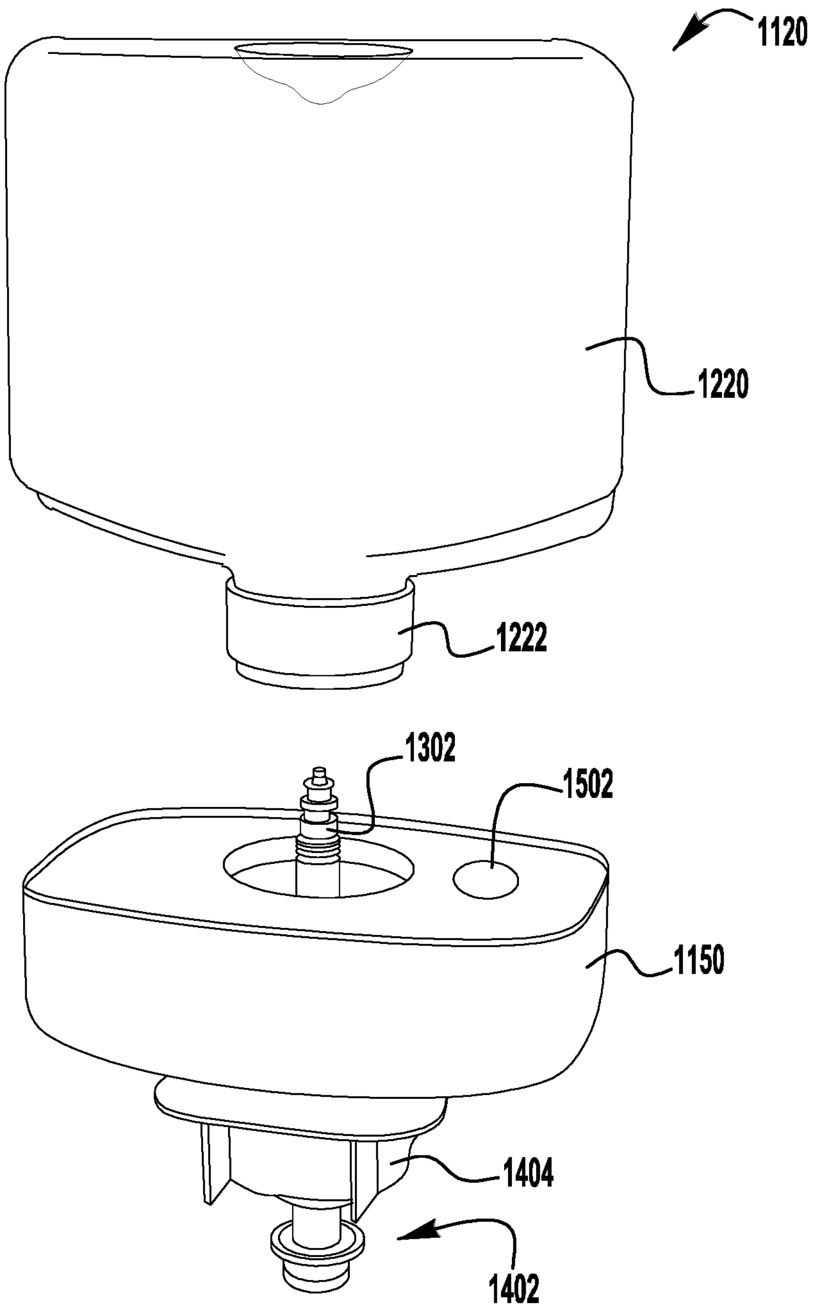
FIG. 15 is an exemplary embodiment of the refill unit separated from the semi-permanent reservoir and pump.

FIG. 15 illustrates the refill unit 1120 and semi-permanent reservoir 1150 being separated, as described above, after removal of both the refill unit 1120 and the semi-permanent reservoir 1150 from dispenser 1100. The ability to remove the semi-permanent reservoir 1150 from dispenser 1100 allows a user to readily replace the semi-permanent reservoir 1150 and pump 1402 in the event that the pump 1402 clogs, fails, or otherwise becomes inoperable. It also allows the ability for the semi-permanent reservoir 1150 to be periodically replaced.

The ability to reuse pump 1402 multiple times provides additional sustainability for dispenser 1100 in that only the refill unit 1120 needs to be replaced when the refill unit 1120 is empty. In some embodiments, container 1220 and container connector 1222 are made from recyclable material. In some embodiments, the recyclable material for the container 1220 and container connector 1222 are made from material having the same recycling number. In some embodiments, the container 1220 and container connector 1222 are made from material having recycling number 1, polyethylene terephthalate ("PET"). In some embodiments, the container 1220 and container connector 1222 are made from material having recycling number 2, high density polyethylene ("HDPE"). In some embodiments, the container 1220 and container connector 1222 are made from material having recycling number 3, polyvinyl chloride ("PVC"). In some embodiments, the container 1220 and container connector 1222 are made from material having recycling number 4, low-density polyethylene ("LDPE"). In some embodiments, the container 1220 and container connector 1222 are made from material having recycling number 5, polypropylene ("PP"). In some embodiments, the container 1220 and container connector 1222 are made from material having recycling number 6, polystyrene ("PS").

As can be seen in FIG. 15, semi-permanent reservoir 1150 includes a vent 1502 located in a top surface 1607 of the semi-permanent reservoir 1150. Vent 1502 allows air that has entered semi-permanent reservoir 1150 when semi-permanent reservoir 1150 is depleted to escape to the atmosphere when refill unit 1120 is connected to semi-permanent reservoir 1150.

In this exemplary embodiment refill unit 1120 has a collapsible container 1220. Accordingly, as fluid is pumped out of refill unit 1120 vacuum pressure created inside of refill unit 1120 causes container 1220 to collapse. In some embodiments, refill unit 1120 has a non-collapsible container. In such an embodiment, refill unit 1120 may have a vent to allow atmospheric air to enter container 1220 as fluid as being pump out of refill unit 120. In some embodiments, refill unit 1120 has a non-collapsible container and vents through a vent, such as vent 1520, in the semi-permanent reservoir 1150. In some embodiments, refill unit 1120 has a non-collapsible container and vents through a vent in any of the manners as shown, described or incorporated above.

Figure 16:
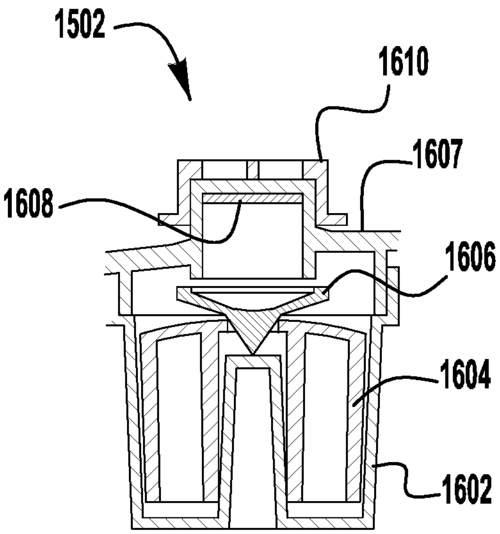
FIG. 16 is a cross-section of an exemplary vent valve for the semi-permanent reservoir.
Figure 16A:
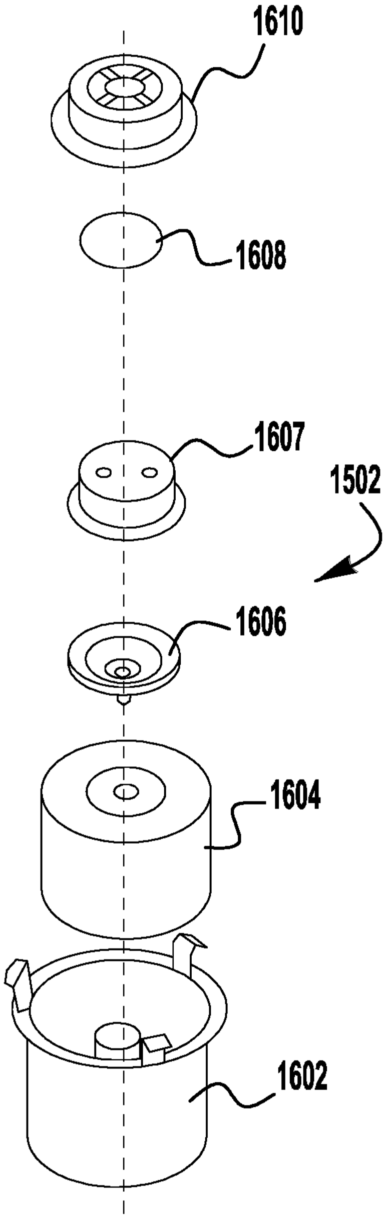
FIG. 16A is an exploded view of the exemplary vent valve of FIG. 6.

FIGS. 16 and 16A are an exemplary embodiment of a vent valve 1120. In this exemplary embodiment, vent 1502 is a floating vent. Vent 1502 allows filtered air to enter semi-permanent reservoir 1150 when liquid is pumped out of semi-permanent reservoir 1150 and the refill unit 1120 is empty. In addition, vent 1502 allows air to flow out of semi-permanent reservoir 1150 when the semi-permanent reservoir 1150 is filling with fluid, but prevents fluid and air from flowing out of semi-permanent reservoir 1150 when semi-permanent reservoir 1150 is full of liquid because the rise in the level of fluid causes the valve 1606 to float upward and seal off the passage out of the semi-permanent reservoir 150.

Vent 1502 includes a reservoir float guide 1602, a reservoir float 1604, a pull-in float valve 1606, a filter 1608 and a filter cap 1610. Vent 1502 is configured to allow air to flow out of semi-permanent reservoir 1150 and prevent contamination from entering semi-permanent reservoir 1150.

Filter 1608 has a porosity that is sufficient to prevent bacteria from passing through the filter. In some embodiments, filter 1608 has a porosity of about 0.045 μm. In an exemplary embodiment, filter 1608 is a nylon syringe filter having a porosity of 0.45 μm and has a diameter of about 25 mm. Thus, any air flowing into semi-permanent reservoir 1150 is free from contaminants and/or bacteria.

Figure 17:
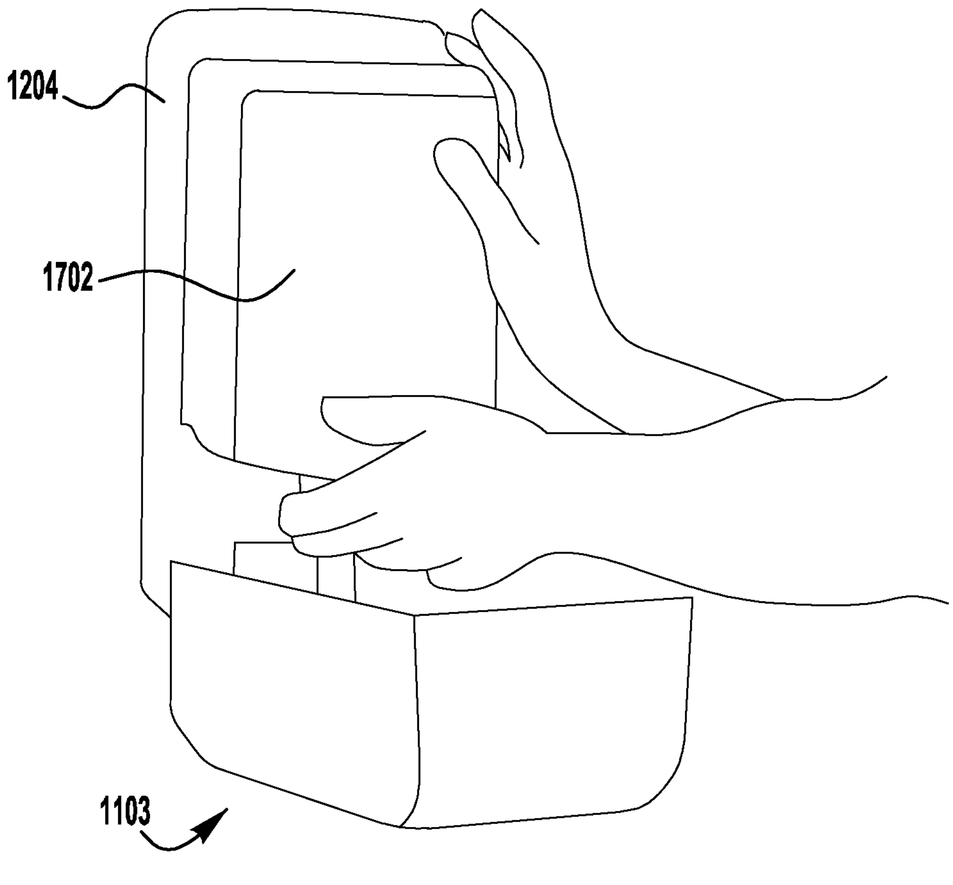
FIG. 17 is an exemplary dispenser that is configured to accept either a refill unit or a semi-permanent reservoir, pump and novel refill unit.

FIG. 17 illustrates dispenser 1100 with refill unit 1120, semi-permanent reservoir 1150 and pump 1402 and a refill unit 1702 being inserted therein. Refill unit 11702 includes a container and a pump (not shown). In some embodiments, the refill unit 120, semi-permanent reservoir 1150 and pump 1402 are sized to have the same footprint as a refill unit 1702. Accordingly, a refill unit 1702 can be easily retrofitted to accept a refill unit 1120, semi-permanent reservoir 1150 and pump 1402. In some embodiments, no modification to the dispenser is necessary.

In addition, in some embodiments, the product to be dispensed is a soap formulation that resists bacterial growth. Such a formulation is beneficial when reusing a portion of the system that has come into contact with fluid. Exemplary formulations may be found in Applicant's co-pending applications, including U.S. Provisional Patent Application titled "Alcohol Containing Topical Cleansing Composition" Ser. No. 62/492,622, which was filed on May 1, 2017; U.S.

Non-Provisional patent application Ser. No. 15/967,815 titled "Alcohol Containing Low-Water Cleansing Composition, filed on May 1, 2018; and U.S. Non-Provisional patent application Ser. No. 15/968,082 titled "Alcohol Containing Non-Antimicrobial Cleansing Composition filed on May 1, 2018, and which are all incorporated herein by reference herein in their entirety. In exemplary embodiments, the formulation contained in the bulk refill containers and dispensers is a soap containing alcohol. In some embodiments, the volume of alcohol is less than about 40%. In some embodiments, the volume of alcohol is less than about 35%. In some embodiments, the volume of alcohol is less than about 30%. In some embodiments, the volume of alcohol is less than about 25%. In some embodiments, the volume of alcohol is less than about 20%. The alcohol prevents, or helps prevent bacterial from growing.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A dispenser comprising:
- a housing;
- an actuator;
- a pump;
- a reservoir;
- the reservoir having
  - one or more connectors for connecting to a refill unit;
  - wherein the one or more connectors are configured to allow liquid to flow out of the refill unit and into the reservoir and to allow air to flow from the reservoir to the refill unit;
  - wherein the one or more connectors has an air inlet and a liquid outlet; and
  - wherein a bottom of the air inlet is above a bottom of the liquid outlet;
  - a vent;
  - a reservoir outlet in fluid communications with the pump; and
- a dispenser outlet.

2. The dispenser of claim 1 wherein the vent is in a side wall of the reservoir.

3. The dispenser of claim 1 wherein the vent is in a top surface of the reservoir.

4. The dispenser of claim 1 wherein the one or more connectors is a single connector and the single connector has a first passage for the air and a second passage for the liquid.

5. The dispenser of claim 1 further comprising a vent valve.

6. The dispenser of claim 5 wherein the vent valve comprises a float.

7. The dispenser of claim 1 wherein the vent allows the air to flow out of the reservoir.

8. The dispenser of claim 1 wherein the vent allows the air to flow into the reservoir.

9. The dispenser of claim 1 wherein the reservoir comprises an opening located in a bottom surface for receiving at least a portion of the pump.

10. The dispenser of claim 9 wherein the pump is a venting pump and the reservoir is vented through the opening located in the bottom surface of the reservoir.

11. The dispenser of claim 1 wherein the vent is located above the liquid in the reservoir.

12. The dispenser of claim 1 wherein the vent is located below the liquid in the reservoir.

13. The dispenser of claim 1 wherein the reservoir has a top surface and the top surface includes a raised portion forming a cavity in the interior of the reservoir, and wherein the one or more connectors are located in the raised portion.

14. The dispenser of claim 1 wherein the one or more connectors is one or more posts.

15. The dispenser of claim 1 further comprising the refill unit.

16. The dispenser of claim 15, wherein the refill unit comprises a resealable sealing member that reseals itself when removed from the one or more connectors.

17. A dispenser comprising:
- a housing;
- an actuator;
- a pump;
- a reservoir;
- the reservoir having
  - a first top surface;
  - a second top surface;
  - a cavity formed at least in part by the first top surface and the second top surface;
  - one or more connectors located above at least a portion of the first top surface for connecting to a refill unit;
  - wherein the one or more connectors are configured to allow liquid to flow out of the refill unit and into the reservoir and to allow air to flow from an air inlet in the cavity in the reservoir to the refill unit;
  - a vent located above at least a portion of the top surface;

wherein the vent allows the air to flow out of the reservoir;

wherein the vent allows the air to flow into the reservoir; and wherein the vent prevents the liquid from flowing out of the reservoir through the vent;

a reservoir outlet in fluid communications with the pump; and a dispenser outlet.

18. The dispenser of claim 17 wherein the vent is located above a top surface of the reservoir.

19. The dispenser of claim 17 wherein the vent is located above the liquid.

20. A dispenser comprising:

a housing;

a refill unit;

an actuator;

a pump;

a reservoir;

the reservoir having a first opening for placing the reservoir in fluid communication with the refill unit;

wherein liquid flows out of the refill unit into the reservoir;

wherein air flows from the reservoir into the refill unit;

a second opening for placing the reservoir in fluid communication with the pump; and a third opening for venting the reservoir;

wherein the third opening includes a vent;

wherein at least a portion of the vent is located above an upper surface of the reservoir;

wherein the vent allows the air to flow out of the reservoir;

wherein the vent allows the air to flow into the reservoir; and wherein the vent prevents the liquid from flowing out of the reservoir through the vent;

a reservoir outlet placing the second opening in fluid communications with the pump; and a dispenser outlet.

* * * * *